US008890037B2

(12) United States Patent
Best

(10) Patent No.: US 8,890,037 B2
(45) Date of Patent: Nov. 18, 2014

(54) RADIANT TUBE BROILER

(75) Inventor: Willie H. Best, Columbia, SC (US)

(73) Assignee: Char-Broil, LLC, Columbus, GA (US)

( * ) Notice: Subject to any disclaimer, the term of this patent is extended or adjusted under 35 U.S.C. 154(b) by 54 days.

(21) Appl. No.: 13/489,710

(22) Filed: Jun. 6, 2012

(65) Prior Publication Data

US 2012/0241435 A1    Sep. 27, 2012

Related U.S. Application Data

(62) Division of application No. 11/983,375, filed on Nov. 8, 2007, now Pat. No. 8,227,728.

(60) Provisional application No. 60/858,152, filed on Nov. 10, 2006.

(51) Int. Cl.
| | |
|---|---|
| *A47J 37/00* | (2006.01) |
| *A47J 37/06* | (2006.01) |
| *F24C 15/32* | (2006.01) |
| *F24C 3/14* | (2006.01) |
| *F24C 3/04* | (2006.01) |

(52) U.S. Cl.
CPC ............ *F24C 15/32* (2013.01); *A47J 37/0635* (2013.01); *A47J 37/0688* (2013.01); *F24C 3/14* (2013.01); *F24C 3/047* (2013.01); *A47J 37/0652* (2013.01)
USPC ............................ 219/411; 219/415; 219/428

(58) Field of Classification Search
CPC  A47J 37/0635; A47J 37/0652; A47J 37/0688
USPC ........ 99/427, 443 R, 447, 450; 219/370, 389, 219/400, 405, 411; 126/38, 39 R, 40, 373, 126/376, 343.5 A, 344, 345
See application file for complete search history.

(56) References Cited

U.S. PATENT DOCUMENTS

| 14,340 | A | 3/1856 | Albro |
|---|---|---|---|
| 1,329,408 | A | 2/1920 | Jackson |

(Continued)

FOREIGN PATENT DOCUMENTS

| CN | 1240910 | 1/2000 |
|---|---|---|
| DE | 102 15 688 | 6/2003 |

(Continued)

OTHER PUBLICATIONS

P.Sheridan, et al., "Application of far infra-red radiation to cooking of meat products", Journal of Food Engineering, 1999, pp. 203-208, vol. 41, Elsevier Science Ltd.

(Continued)

*Primary Examiner* — Thien S Tran
(74) *Attorney, Agent, or Firm* — Dennis D. Brown; Brown Patent Law, P.L.L.C.

(57) ABSTRACT

An emitter tube has an outer surface and an inner surface, wherein the inner surface defines a cavity of the emitter tube, and the cavity of the emitter tube is adapted for receiving food. An outer tube has an inner surface that defines a cavity of the outer tube, and the emitter tube is positioned in the cavity of the outer tube. A heating unit is for heating the outer surface of the emitter tube so that heat energy is transferred by conduction from the outer surface of the emitter tube to the inner surface of the emitter tube, and the inner surface of the emitter tube emits infrared radiant energy into the cavity of the emitter tube so that a majority of the energy that is transferred to the food within the emitter tube is in the form of infrared radiant energy.

4 Claims, 17 Drawing Sheets

(56) References Cited

U.S. PATENT DOCUMENTS

| | | | |
|---|---|---|---|
| RE14,965 E | 10/1920 | Bilderback |
| 1,399,704 A | 12/1921 | Eida |
| 1,489,351 A | 4/1924 | Jackson |
| 1,996,434 A | 4/1935 | O'Dowd |
| 3,155,814 A | 11/1964 | Appleman et al. |
| 3,245,458 A | 4/1966 | Patrick et al. |
| 3,277,948 A | 10/1966 | Best |
| 3,437,415 A | 4/1969 | Davis et al. |
| 3,561,902 A | 2/1971 | Best |
| 3,586,825 A | 6/1971 | Hurley |
| 3,663,798 A | 5/1972 | Speidel et al. |
| 3,683,058 A | 8/1972 | Partiot |
| 3,941,117 A | 3/1976 | Pei et al. |
| 4,024,839 A | 5/1977 | Reid, Jr. et al. |
| 4,039,275 A | 8/1977 | McGettrick |
| 4,057,670 A | 11/1977 | Scheidler |
| 4,140,100 A | 2/1979 | Ishihara |
| 4,155,294 A * | 5/1979 | Langhammer et al. ......... 99/427 |
| 4,207,456 A | 6/1980 | Best |
| 4,235,023 A | 11/1980 | Best |
| 4,276,869 A | 7/1981 | Kern |
| 4,321,857 A | 3/1982 | Best |
| 4,375,802 A | 3/1983 | Wallasvaara |
| 4,403,597 A | 9/1983 | Miller |
| 4,426,792 A | 1/1984 | Best |
| 4,437,833 A | 3/1984 | Mertz |
| 4,508,097 A | 4/1985 | Berg |
| 4,537,492 A | 8/1985 | Lein et al. |
| 4,546,553 A | 10/1985 | Best |
| 4,569,657 A | 2/1986 | Laspeyres |
| 4,575,616 A | 3/1986 | Bergendal |
| 4,606,261 A | 8/1986 | Bernardi |
| 4,715,356 A | 12/1987 | Reynolds |
| 4,785,552 A | 11/1988 | Best |
| 4,798,192 A | 1/1989 | Maruko |
| 4,839,502 A | 6/1989 | Swanson et al. |
| 4,883,423 A | 11/1989 | Holowczenko |
| 4,886,044 A | 12/1989 | Best |
| 4,889,972 A | 12/1989 | Chang |
| 4,909,137 A | 3/1990 | Brugnoli |
| 4,960,977 A | 10/1990 | Alden |
| 5,024,209 A | 6/1991 | Schaupert |
| 5,028,760 A | 7/1991 | Okuyama |
| 5,062,408 A | 11/1991 | Smith et al. |
| 5,062,788 A | 11/1991 | Best |
| 5,111,803 A | 5/1992 | Barker et al. |
| 5,218,952 A | 6/1993 | Neufeldt |
| 5,230,161 A * | 7/1993 | Best .............................. 34/267 |
| 5,240,411 A | 8/1993 | Abalos |
| 5,277,106 A | 1/1994 | Raymer et al. |
| 5,279,277 A | 1/1994 | Barker |
| 5,306,138 A | 4/1994 | Best |
| 5,313,877 A | 5/1994 | Holland |
| 5,363,567 A | 11/1994 | Best |
| 5,488,897 A | 2/1996 | Snyder |
| 5,494,003 A | 2/1996 | Bartz et al. |
| 5,509,403 A | 4/1996 | Kahlke et al. |
| 5,513,623 A * | 5/1996 | Hong .............................. 126/38 |
| 5,566,607 A | 10/1996 | Schleimer |
| 5,567,459 A | 10/1996 | Gonzalez-Hernandez et al. |
| 5,571,009 A | 11/1996 | Stalhane et al. |
| 5,582,094 A | 12/1996 | Peterson et al. |
| 5,594,999 A | 1/1997 | Best |
| 5,676,043 A | 10/1997 | Best |
| 5,711,661 A | 1/1998 | Kushch et al. |
| 5,761,990 A | 6/1998 | Stewart et al. |
| 5,782,166 A | 7/1998 | Lin |
| 5,823,099 A | 10/1998 | Ko |
| 5,879,154 A | 3/1999 | Suchovsky |
| 5,890,422 A | 4/1999 | Clark et al. |
| 5,909,533 A | 6/1999 | Kitabayashi et al. |
| 5,989,013 A | 11/1999 | Gray |
| 6,114,666 A | 9/2000 | Best |
| 6,159,001 A | 12/2000 | Kushch et al. |
| 6,190,162 B1 | 2/2001 | Smith et al. |
| 6,205,996 B1 | 3/2001 | Ryan |
| 6,461,150 B1 | 10/2002 | Sirand |
| 6,657,168 B1 | 12/2003 | Lazzer |
| 6,779,519 B2 | 8/2004 | Harneit |
| 6,783,226 B2 | 8/2004 | Szlucha |
| 7,202,447 B2 | 4/2007 | Kingdon et al. |
| 7,219,663 B2 | 5/2007 | Cuomo |
| 8,074,634 B2 | 12/2011 | Best |
| 2001/0036610 A1 | 11/2001 | Wood |
| 2002/0020405 A1 | 2/2002 | Coleman et al. |
| 2004/0011350 A1 | 1/2004 | Dowst et al. |
| 2004/0060552 A1 | 4/2004 | Yamada et al. |
| 2004/0152028 A1 | 8/2004 | Singh et al. |
| 2004/0250688 A1 | 12/2004 | Farkas et al. |
| 2005/0226976 A1 | 10/2005 | Chung |
| 2006/0003279 A1 | 1/2006 | Best |
| 2006/0021517 A1 | 2/2006 | Best |
| 2006/0124627 A1 * | 6/2006 | Friedl et al. .................. 219/411 |
| 2006/0266979 A1 | 11/2006 | Ra |
| 2007/0125357 A1 | 6/2007 | Johnston |
| 2008/0072890 A1 | 3/2008 | Best |

FOREIGN PATENT DOCUMENTS

| | | |
|---|---|---|
| EP | 0 221 686 | 5/1987 |
| EP | 1 028 292 | 8/2000 |
| EP | 1 096 203 | 5/2001 |
| FR | 1 204 968 | 1/1960 |
| GB | 23552 | 0/1915 |
| GB | 432 481 | 7/1935 |
| GB | 432481 * | 7/1935 |
| GB | 562 136 | 6/1944 |
| GB | 576 377 | 4/1946 |
| GB | 1 029 774 | 5/1966 |
| GB | 1 339 345 | 12/1973 |
| GB | 2 362 451 | 11/2001 |
| GB | 2 409 265 | 6/2005 |
| JP | 2000 121064 | 4/2000 |
| JP | 2004 179089 | 6/2004 |
| WO | WO 2004/103133 | 12/2004 |
| WO | WO 2008/125258 | 10/2008 |
| WO | PCT/US2007/023577 | 3/2009 |

OTHER PUBLICATIONS

P.S. Sheridan et al., "Analysis of yield while cooking beefburger patties using far infrared radiation", Journal of Food Engineering, 2001, pp. 3-11, vol. 51, Elsevier Science Ltd.

N. Shilton et al., "Modeling of heat transfer and evaporative mass losses during the cooking of beef patties using far-infrared radiation", Journal of Food Engineering, 2002, pp. 217-222, vol. 55, No. 3, Elsevier Science Ltd. (Abstract Only).

N.C. Shilton et al., Determination of the thermal diffusivity of ground beef patties under infrared radiation oven-shelf cooking, Journal of Food Engineering, Mar. 2002, pp. 39-45, vol. 52, No. 1 (Abstract Only).

Y. Takahashi et al., "Impact of IR Broiling on the Thiamin and Riboflavin Retention and Sensory Quality of Salmon Steaks for Foodservice Use", Journal of Food Science, 1987, pp. 4-6, vol. 52, No. 1 (Abstract Only).

P. Sheridan et al., "Application of far infra-red radiation to cooking of meat products", Journal of Food Engineering, 1999, pp. 203-208, vol. 41, No. 3/4, International Food Information Service (Abstract Only).

Cross Section of G3000 Cabinet Unit, Sep. 4, 2001, Thermal Engineering Corp., Columbia, South Carolina.

Cross Section of G-Series Burner System, Sep. 4, 2001, Thermal Engineering Corp., Columbia, South Carolina.

Char-Broil, Assembly Instructions for Models 6320, 6321 & 6323; 1992, pp. 1-18.

Extended European Search Report European Patent Office, Nov. 25, 2011, Published in: EP.

Communication pursuant to Article 94(3) EPC; EPO Application No. 11 161 358.4-1602; European Patent Office; May 19, 2014.

* cited by examiner

RADIANT TUBE BROILER

CROSS-REFERENCE TO RELATED CASES

This application is a divisional of co-pending U.S. patent application Ser. No. 11/983,375, filed Nov. 8, 2007, the disclosure of which is incorporated by reference as if fully set out at this point. The present application also claims the benefit of U.S. Provisional Application No. 60/858,152, which was filed Nov. 10, 2006. The entire disclosure of U.S. Provisional Application No. 60/858,152 is incorporated herein by reference.

FIELD OF THE INVENTION

The present invention generally relates to radiant heaters and, more particularly, to cooking devices that cook with infrared radiant energy.

BACKGROUND OF THE INVENTION

Broiling is a popular and well-known method of preparing food. Broiling comprises cooking with exposure to infrared radiant energy. Most appliances designed for broiling emit the infrared radiant energy to the food from a single surface or in some instances from two surfaces, and usually the food is turned manually or by the use of a rotisserie that rotates the food adjacent to or over a source of infrared radiant energy.

SUMMARY OF THE INVENTION

In accordance with an exemplary embodiment of the present invention, an outer surface of an emitter chamber (e.g., an emitter in the shape of a chamber, tube, container, cavity, passageway, tunnel, or the like) is heated by a heating unit, so that the heat energy is transferred to the inner surface of the emitter chamber by conduction, and the inner surface of the emitter chamber emits infrared radiant energy to food positioned within the emitter chamber. The heating unit and the emitter chamber are cooperative so that a majority (e.g., substantially 100%) of the energy that is transferred to the food within the emitter chamber is in the form of infrared radiant energy that is directed to the food from a plurality of directions by emission and/or reflection of the infrared radiant energy. The emitter chamber may extend all the way around (e.g., substantially all the way around) the food positioned within the emitter chamber, so that, for example, the infrared radiant energy is directed to the food through an angular measure of at least about 360° and/or at least a portion of the emitter chamber directs any hot gasses from the heating unit away from the food.

The emitter chamber can take on a wide variety of different shapes. Generally described and in accordance with exemplary embodiments of the present invention, the emitter chamber includes a wall having an inner surface that extends along and at least partially around an interior space (e.g., cooking cavity). The wall of the emitter chamber can be shapes other than cylindrical. Nonetheless and for example rather than for the purposes of limiting the scope of the present invention, in the exemplary embodiments of the present invention, the emitter chamber comprises a cylindrical tube (e.g., an emitter tube).

The heating apparatuses of the exemplary embodiments of the present invention are often described in the context of heating and/or cooking food, such that the heating apparatuses can be referred to as radiant tube broilers. Nonetheless, the heating apparatuses of the exemplary embodiments of the present invention can be used for purposes other than heating and/or cooking food; therefore, references to the radiant tube broilers are to be understood to be nonlimiting, since the radiant tube broilers can be more generally referred to as heating apparatuses. For example, the heating apparatus of the exemplary embodiments of the present invention can be used in numerous applications where it is desirable to heat an article or a portion thereof. As one specific example, the heating apparatuses of the exemplary embodiments of the present invention can be used to dry coatings (e.g., of paint) or the like.

The emitter tube can be mounted to a support frame in a vertical or horizontal position or any angle in between these positions. In accordance with the exemplary embodiments of the present invention, the support frame includes an outer chamber (e.g., a housing in the shape of a chamber, tube, container, cavity, passageway, tunnel, or the like). The outer chamber can take on a wide variety of different shapes. Nonetheless and for example rather than for the purposes of limiting the scope of the present invention, for some of the exemplary embodiments of the present invention, the outer chamber is in the form of a cylindrical tube (e.g., an outer tube).

The outer tube has a larger diameter (or cross-sectional dimension when the tubes are not circular) than the emitter tube and surrounds (e.g., substantially surrounds) the emitter tube to form a passageway (e.g., heating cavity) between the tubes. The outer tube typically encloses most or all of the outer surface of the emitter tube. In one embodiment, the opposite ends of the emitter tube are typically not closed by the outer tube, although they may be obstructed or substantially closed by other features. Hot gases (e.g., products of combustion when a gas burner is employed) are directed into the heating cavity defined between the two tubes to deliver heat energy to the exterior surface of the emitter tube. The heat energy supplied to the outer surface of the emitter tube is conducted through the wall of the emitter tube so that the inner surface of the emitter tube emits infrared radiant energy into the cooking cavity of the radiant tube broiler.

In accordance with the exemplary embodiments of the present invention, the hot gases that flow through the heating cavity formed between the two tubes are exhausted in a way that prevents the food within the cooking cavity from being exposed to the gases from the heating cavity, providing a method by which the food is broiled by infrared radiant energy and is typically not baked by convective energy (e.g., the food is cooked by substantially 100% radiant energy). Accordingly, the cooking cavity may be more specifically referred to as a broiling cavity. It is widely accepted that food broiled by infrared radiant energy retains more moisture than when it is baked by convective energy. This concept is especially true when the infrared radiant energy is produced at long wave lengths (the majority being longer than about 3.5 microns), as can be the case for the exemplary embodiments of the present invention.

In accordance with one acceptable example, the food can be placed in a basket, which is then placed within the broiling cavity. For example, when the tubes extend vertically, the lower end of the emitter tube can optionally be obstructed (e.g. closed) so that the emitter tube is more specifically in the form of an inner emitter container with a bottom wall, and the basket can be supported by the bottom wall. The food can also be placed on racks (e.g., cooking grids) within the broiling cavity. Racks or open type shelves work well to hold the food, especially when the tubes are mounted horizontally within the frame. Also, the food can be passed through the broiling cavity on a conveyor or moving rack, or be held in place by a stationary fork or spear.

As indicated above, the emitter tube can have a closed end (e.g., to form an emitter container). Indeed, both ends of the emitter tube can be closed, with one or both of the closure mechanisms (e.g., lid, cap or cover) being openable and/or removable and serving as a door to the broiling cavity. Typically vents are provided in the upper end of the radiant tube broiler. In one example, when the tubes are mounted vertically within a frame or to a platform, the bottom end of the emitter tube is closed (e.g., substantially closed) to form the emitter container, and a burner can be mounted under the bottom of the emitter container in a way to provide for the hot gases from combustion to flow into the heating cavity. In this arrangement, the bottom or end of the emitter container is also heated. Alternatively, a circular burner may be mounted around the outer surface of the emitter tube/emitter container in a way that will direct the products of combustion into the heating cavity in a manner that prevents the bottom end of the emitter container from being heated by the burner. With the circular burner design, the hot gases are directed into the heating cavity without first heating the bottom of the emitter container. This seeks to prevent flames from forming in the emitter container when oils, discharged during the cooking process, collect in the bottom of the emitter container (where they could be ignited by the hot bottom of the emitter container if the bottom were heated too much). Also, a discharge opening can be provided in the bottom of the emitter container, through which oil and juices, which would otherwise tend to accumulate in the bottom of the emitter container, can exit the emitter container and be collected, for example in a pan mounted underneath the emitter container.

When the tubes are mounted horizontal or nearly so, the ends of the broiling cavity can optionally be obstructed (e.g., substantially closed), with one or both ends being capable of being selectively opened and closed with a door or other suitable mechanism. In this horizontal configuration, the outer tube will typically have an opening at the bottom side to provide for the entrance of the hot gases into the heating cavity, and the burner is mounted parallel to the tubes. When it is desirable to provide a surface at the bottom of the broiling cavity that will remain under the ignition temperature of the oils, the burner can use side ports that can be separated by varying the width of the burner. The hot gases can enter the heating cavity separated by the width of the burner. This will provide a cool zone where the oils and juices accumulate, preventing ignition. The same results can be achieved by using two line burners.

In some embodiments of the present invention, the ends of the emitter tube will be open to allow for a conveyor to pass through the broiling cavity. In other embodiments, only one end may be left open. In embodiments where one or more ends of the emitter tube are open, typically the emitter tube will extend beyond the food to ensure that the food receives uniform infrared radiant energy from all directions. Stated differently, it can be advantageous for the food within the broiling cavity to be sufficiently distant from any open ends of the broiling cavity/emitter tube so that the food receives uniform infrared radiant energy from all directions.

In accordance with some of the exemplary embodiments of the present invention, the broiling cavity is an essentially (e.g., substantially) closed cavity into which the infrared radiant energy is emitted, so that the infrared radiant energy approaches black body conditions. Therefore, the emissivity of the surfaces of the broiling cavity (e.g., the inner surface of the emitter chamber/emitter tube/emitter container) is not as important as the emissivity of an emitter that is emitting infrared radiant energy into an open system. In this regard and for the purposes of providing a comparative example in this disclosure, an open system can be defined as one in which most of the non-absorbed radiant energy is not reflected back into the emitting surface. Since in accordance with the exemplary embodiment of the present invention the emissivity of the surface that radiates the energy (i.e., the emitter tube/emitter container) is not of extreme importance, this surface can be made of metal (preferably stainless steel) which will be noncorrosive and easy to clean. Typically, the emissivity of non-oxidized stainless steel is low, and therefore, a non-oxidized stainless steel surface is a poor emitter of infrared energy. However, in accordance with the exemplary embodiments of the present invention, this limitation of stainless steel (i.e., making the emitter tube/emitter container of non-oxidized stainless steel) does not prevent the system from operating as efficient as if the stainless steel possessed a high emissivity. Numerous other components of the radiant tube broiler may also be constructed of metal, such as stainless steel.

The degree of infrared radiant energy emitted from the interior surfaces of the broiling cavity/the inner surface of the emitter tube or container will be a function of the Stefan-Boltzman law with the infrared radiant energy being constantly emitted, absorbed and reflected by the interior surface of the broiling cavity. When there is not an absorbing medium (food) within the broiling cavity, at some point there will exist an equal exchange of the infrared radiant energy between the surfaces within the broiling cavity except for the difference in losses to the exterior from the various surfaces based on their location. When food is placed within the broiling cavity, the infrared radiant energy will be generated based on the Stefan-Boltzman Equation with the emissivity being considered nearly black (equal to one). The resulting equation will then be:

$$Q = 0.173 \times 10^8 (A)(T_1^4 - T_2^4)$$

Q=energy generated
A=area of emitting surface
$T_1^4$=Temp. of emitter ° R
$T_2^4$=Temp. of absorber ° R Except for the wall losses, the energy generated will be absorbed by the food being cooked. The transient heat transfer of infrared radiant energy during the time the food is cooked is rather complex and does not impact this invention. The total energy that is absorbed by the food is determined by the following well-known and used equation:

$$Q = Wcp(T_1 - T_2)$$

Q=Heat transferred
W=Wt of food
Cp=Specific heat of the product (constant pressure)
$T_1$=Final Temp.
$T_2$=Initial Temp.

The weight loss of the food can be considered water, with the change in enthalpy (vapor or liquid) being accounted for to determine the transfer of energy more precisely.

There are many features and advantages of the present invention which relate to the cooking process. The food (e.g., primarily meat) can be cooked very slowly or much faster than in a conventional oven. For example, the emitter tube may be heated to about 200° F. to slow cook with substantially 100% infrared radiant energy, the emitter tube may be heated to about 750° F. to cook more quickly with substantially 100% infrared radiant energy, and the emitter tube may be heated to a wide range of temperatures in between to cook with substantially 100% infrared radiant energy. In contrast to the exemplary embodiments of the present invention, a typical oven bakes the food with the transfer of energy being mostly convective.

In accordance with one exemplary method of the present invention, the radiant tube broiler can be used to simulate frying without the need to submerge food into hot oil. In one acceptable example, a turkey (12-13 pounds) or other type of fowl (e.g., poultry) can be coated (e.g., at least partially coated) with cooking oil and cooked within about 1.25 hours. The oil on the surface of the bird absorbs the infrared energy and is heated to a temperature of about 370°-390° F. This process creates a frying effect in that the surface of the bird is exposed to hot oil in the same manner as if it was submerged in the oil. The appearance of the bird and the taste is typically the same as if it was fried while submerged in hot cooking oil. When two turkeys are cooked (one in a conventional turkey fryer and the other in a construct of this invention) it is typically difficult to determine any difference in the appearance or taste. The cooking time required is about the same for both methods and less than would be required when cooked in a conventional home type oven.

Because of the variation possible in the wide range of infrared radiant energy intensity, the radiant tube broiler of the exemplary embodiments of the present invention can be used to slow cook (broil) such as barbequing meat of different types that is usually broiled over long periods of time. In many instances this type of cooking requires an excess of six hours. Also, when the food (especially fowl) is coated with cooking oil, it takes on the characteristics of fried food. However, the food, especially meat, can be broiled without a coating using the natural juices and oils contained in the meat. Various types of marinates can also be used during the cooking process and any type of dry seasoning can be used to add flavor.

The radiant tube broiler of at least one embodiment of the present invention can also or alternatively be used as a grill. When the radiant tube broiler is mounted vertically, a cooking grid can be placed over the upper open end of the emitter tube. The infrared energy within the broiling cavity exits from the upper open end of the broiling cavity onto the cooking grid. The broiling cavity acts as a black body generator of infrared energy and the energy is distributed uniformly over the grid. When the construct of an exemplary embodiment of the present invention is to be used as a broiler and a grill, the energy input would need to be greater than when it is used only as a broiler with the food cooked within the broiling cavity. In accordance with an exemplary embodiment of the present invention, good results for broiling only are obtained with a maximum input of 20,000 BTUH when the broiling cavity has a diameter of about 15 inches and a length of about 24 inches. If this size unit were to also be used for grilling on the external surface of a grid, the energy input would typically need to be increased to about 30,000 BTUH. When the radiant tube broiler is used as a grill, the intensity of the infrared energy can be varied to cook fast or cook slowly. An example of fast cooking would be to grill a one-inch steak in about 8 minutes. An example of slow cooking would be to grill one-half of a chicken in about one hour, or for even slower cooking, barbeque meat over multiple hours.

The radiant tube broiler may also be used to impart flavor to the food from smoke. Various types of wood chips can be put in the broiling cavity so that they become heated from contact with the bottom surface (which typically at least partially defines the broiling cavity) and from absorbing infrared energy to expel smoke that will encompass the food placed within the broiling cavity.

In accordance with the exemplary embodiments of the present invention, the heating unit uses gaseous fuel as the heat source. However, the heating unit that uses gaseous fuel can be replaced with an electric heat source, with at least some of the same benefits being provided. More specifically, the outer surface of the emitter tube/emitter container may be heated by an electric source, so that the resulting heat is conducted to the inner surface of the emitter tube/emitter container and then is emitted as infrared radiant energy therefrom; the cooking performance may be the same as when the heating unit that uses gaseous fuel is used.

Other aspects and advantages of the present invention will become apparent from the following.

BRIEF DESCRIPTION OF THE DRAWINGS

Having described some aspects of the invention in general terms, reference will now be made to the accompanying drawings, which are not necessarily drawn to scale and are briefly described in the following.

DETAILED DESCRIPTION OF THE PREFERRED EMBODIMENTS

Referring in greater detail to the drawings, in which like numerals refer to like parts throughout the several views, exemplary embodiments of the present invention are described in the following. An aspect of the exemplary embodiments of the present invention is the provision of radiant tube broilers for broiling food by infrared radian energy. Food that is at least partially enclosed within a broiling cavity of the radiant tube broiler receives infrared radiant energy, which is emitted or reflected from surfaces that define the broiling cavity, from a plurality of directions.

First Exemplary Embodiment

Figure 1:
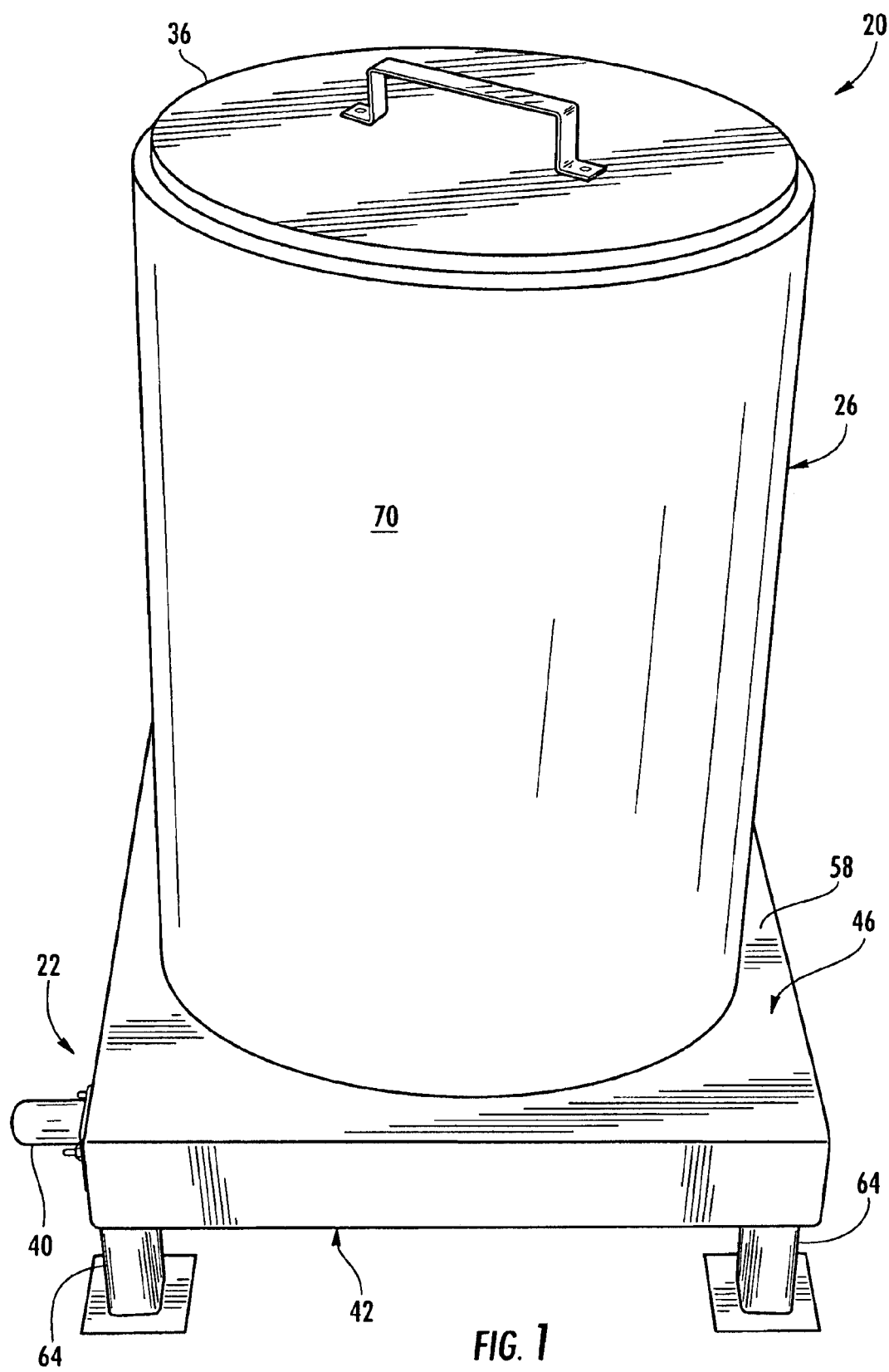
FIG. 1 is a perspective view of a radiant tube broiler (with its orifice, control valve, adjusting knob and manifold omitted) in accordance with a first embodiment exemplary embodiment of the present invention.

FIG. 1 is a perspective view of a cooking apparatus that is in the form of a radiant tube broiler 20 and is described in the following, in accordance with a first exemplary embodiment of the present invention. A very general description of the radiant tube broiler 20 will be followed by more detailed descriptions of features of the radiant tube broiler.

Figure 2:
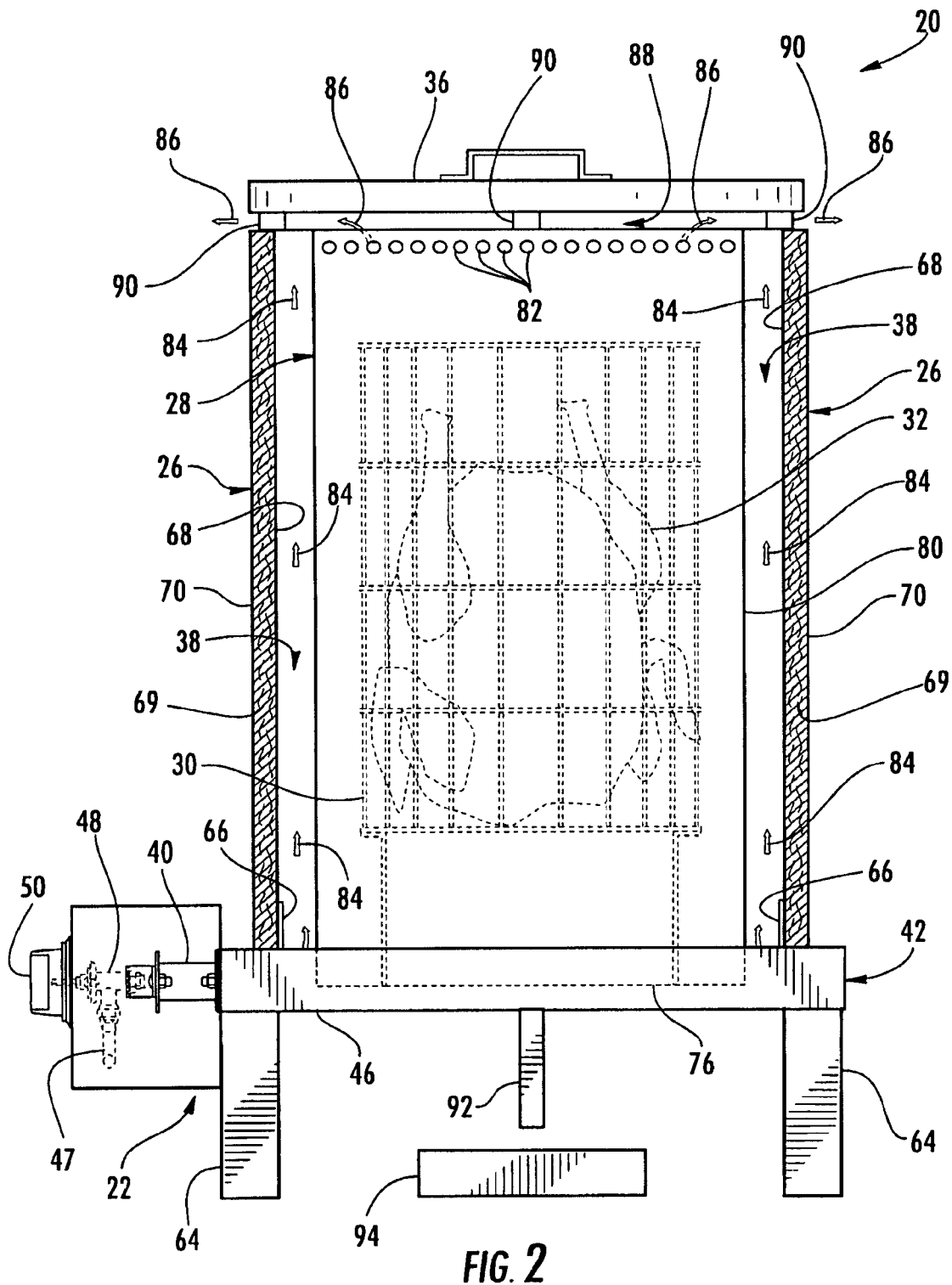
FIG. 2 is a schematic side view of the radiant tube broiler of FIG. 1, with its outer tube vertically sectioned so that half of the outer tube has been removed to show an emitter tube, and a basket that is supporting food within the emitter tube is hidden from view and schematically shown by dashed lines.
Figure 5:
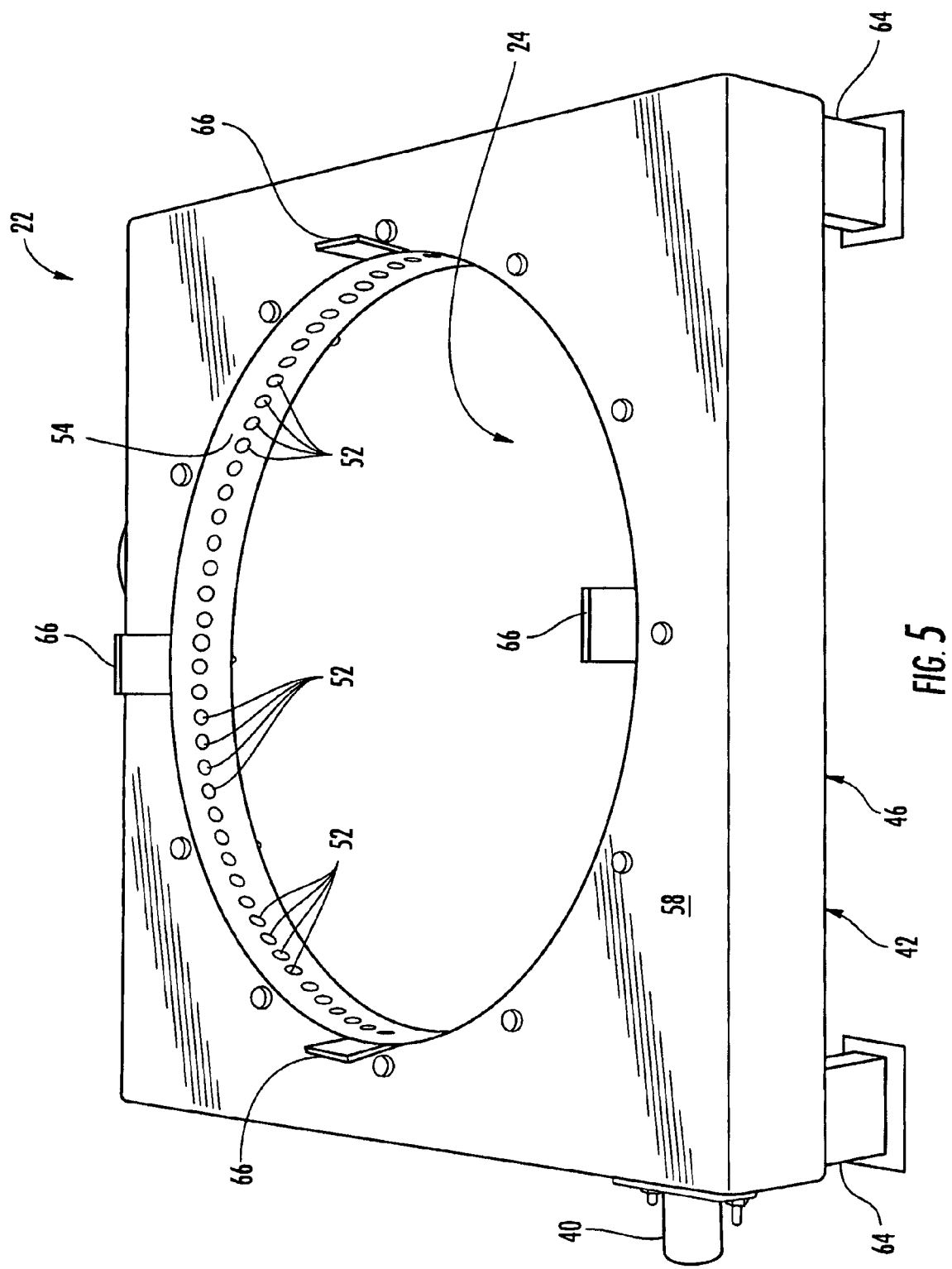
FIG. 5 is a perspective view of the burner unit of the radiant tube broiler of FIG. 1 (with the orifice, control valve, adjusting knob and manifold omitted).

Very generally described and as best understood with reference to FIGS. 1 and 2, the base or lower frame of the radiant tube broiler 20 comprises a heating unit, which may more specifically be a burner unit 22 with a cylindrical, central combustion cavity 24 (FIGS. 5 and 6) that is at least upwardly open. An outer chamber, which may more specifically be a cylindrical outer tube 26 having top and bottom ends that are both open, is mounted to and supported by the burner unit 22, so that the open bottom end of the outer tube 26 is open to and in communication with the combustion cavity 24 of the burner unit 22. In FIG. 2, the outer tube 26 is vertically sectioned so that half of the outer tube has been removed to show interior features of the radiant tube broiler 20.

As best understood with reference to FIG. 2, an emitter chamber, which may more specifically be a cylindrical emitter tube assembly 28, is mounted to and within the outer tube 26. Therefore, the outer tube 26 may be characterized as a frame, or a portion of a frame, for supporting the emitter tube assembly 28. More specifically regarding FIG. 2, half of the outer tube 26 has been cut away to show the emitter tube assembly 28. In FIG. 2, a basket 30 and food 32 supported in the basket are hidden from view within the emitter tube assembly 28 (i.e., within a cylindrical cooking cavity that may more specifically be referred to as a broiling cavity 34 (FIGS. 3 and 4)); therefore, the food and basket are schematically shown by dashed lines.

The emitter tube assembly 28 has top and bottom ends that may both be open. On the other hand, the bottom end of the emitter tube assembly 28 is typically closed or at least partially closed (e.g., the emitter tube assembly 28 may be characterized as an emitter container) as will be discussed in greater detail below. The top ends of the tubes 26, 28 may be at least partially closed with a cover, which may more specifically be in the form of a lid 36 with a handle, or any other suitable obstructing mechanism. Hot gasses from the burner unit 22 flow through an annular heating cavity 38 defined between the emitter tube assembly 28 and the outer tube 26, so that the emitter tube assembly is heated and emits infrared radiant energy to the food 32 positioned within the broiling cavity 34 (FIG. 3) defined in the emitter tube assembly.

The burner unit 22 is discussed in greater detail below primarily with reference to FIGS. 5-8. The burner unit 22 includes an injector tube 40 for supplying a gas-air mixture to a burner 42. Gas is supplied through an orifice 44 (FIGS. 4 and 6) of the injector tube 40, whereby the gas is discharged into the entrance of the injector tube and primary air for combustion is drawn through the injector tube and mixed with the gas while passing through the injector tube. The injector tube 40 is mounted to a plenum 46 of the burner 42, so that the gas-air mixture enters the interior space within the plenum. The gas is typically supplied from a manifold 47 (FIG. 2), through a control valve 48 (FIGS. 2, 4 and 6) and then into the orifice 44. The input of gas/energy can be manually controlled by way of control valve 48. More specifically, the control valve 48 may be operated by an adjusting knob 50 (FIG. 2) or other suitable controller, whereby the supply of the gas-air mixture to the burner 42 is controlled. That is, the adjusting knob 50 or other controller can be used to control the cooking temperatures of the radiant tube broiler 20 as needed for cooking different meats or other foods. Alternatively, the input can be controlled automatically by replacing the manually operated control valve 48 with a thermostatic control valve (not shown).

The interior of the plenum 46 is typically fully closed, except for being open to the injector tube 40 and having a series of discharge ports 52 that extends substantially around (e.g., substantially encircles) the central, cylindrical combustion cavity 24 that is defined by the plenum 46. More specifically; the plenum 46 includes a cylindrical inner wall 54 that extends around the combustion cavity 24 of the plenum. The discharge ports 52 extend along (e.g., are defined through) inner wall 54 of the plenum 46 so that the discharge ports 52 provide passageways between and are in communication with each of the interior of the plenum and the combustion cavity 24 of the plenum.

Each of the discharge ports 52 of the plenum 46 is typically covered with a screen or perforated plate 56, so that the gas-air mixture exits the plenum through the perforations of the perforated plate(s) or the like. More specifically, each of the discharge ports 52 of the plenum 46 is in the form of an aperture in the cylindrical inner wall 54 of the plenum, with each aperture being rather large in diameter (e.g., about 0.6250 inches in diameter), with the perforated plate 56 covering the entrance side of the aperture, and the perforated plate having apertures less than about 0.040 inches in diameter. Alternatively, the discharge ports 52 of the plenum 46 are not covered with the perforated plate(s) 56, or each discharge port can include (e.g., be partially obstructed or defined by) a grouping of the perforated plates or screens arranged in series such as with appropriate spacers therebetween.

The combustion cavity 24 of the plenum 46 is upwardly open at a substantially horizontally extending upper wall 58 of the plenum, and is downwardly open at a substantially horizontally extending lower wall of the plenum that is spaced apart from and opposite from the upper wall of the plenum 46. An annular upper edge of the cylindrical inner wall 54 of the plenum 46 is connected to an annular inner edge of the upper wall 58 of the plenum. Similarly, an annular lower edge of the cylindrical inner wall 54 of the plenum 46 is connected to an annular inner edge of the lower wall of the plenum. Side walls of the plenum 46 are respectively connected between the outer edges of the upper and lower walls of the plenum, and the injector tube 40 extends through an opening in one of the side walls of the plenum.

Figure 6:
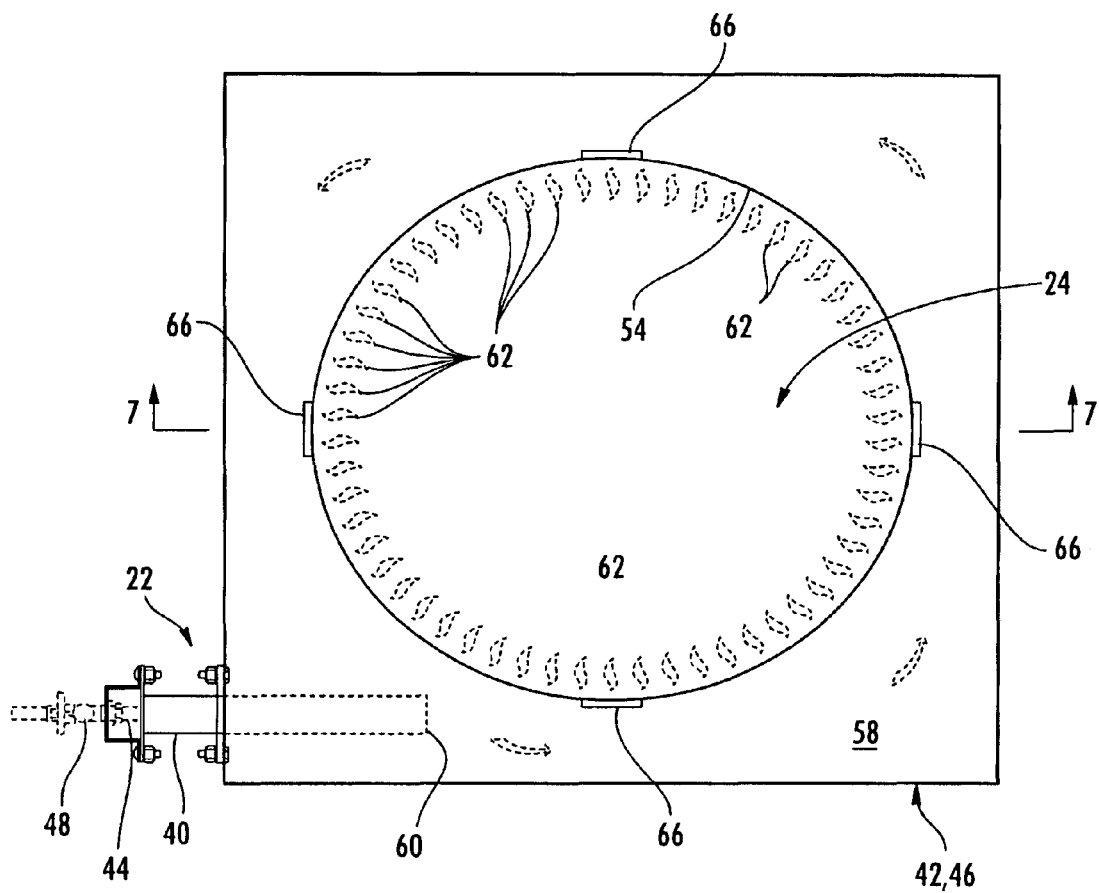
FIG. 6 is a schematic top plan view of the burner unit of FIG. 5.
Figure 7:
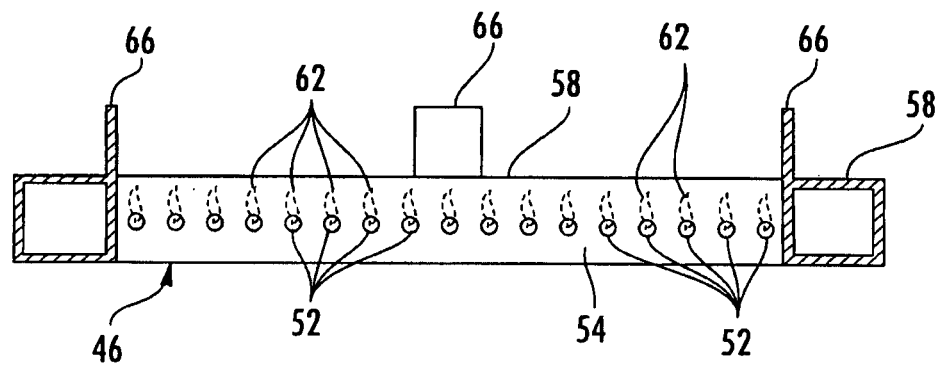
FIG. 7 is a schematic cross-sectional view taken along line 7-7 of FIG. 6.
Figure 8:
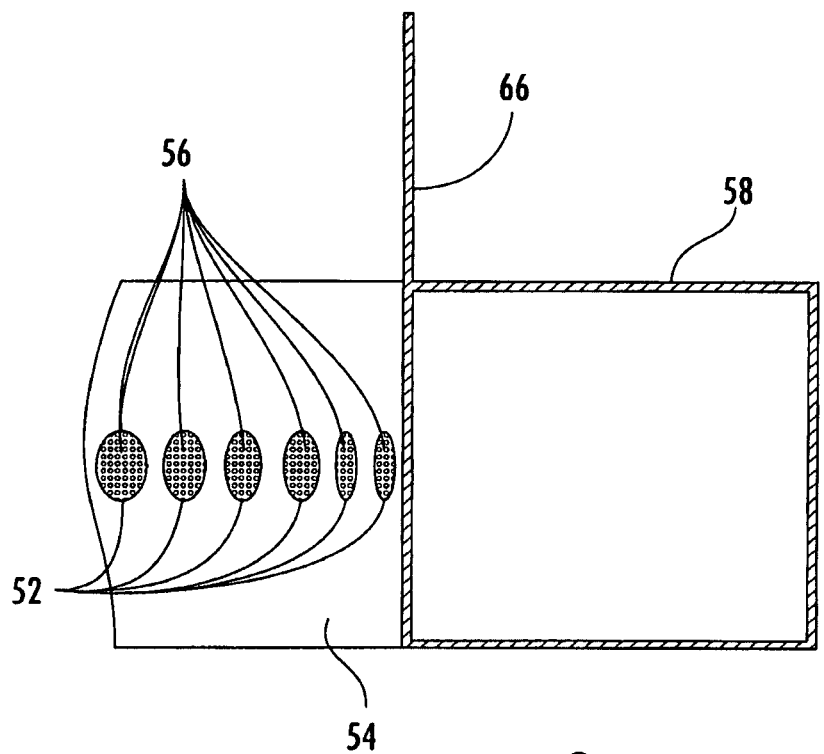
FIG. 8 is an enlarged view of a portion of FIG. 7.
Figure 11:
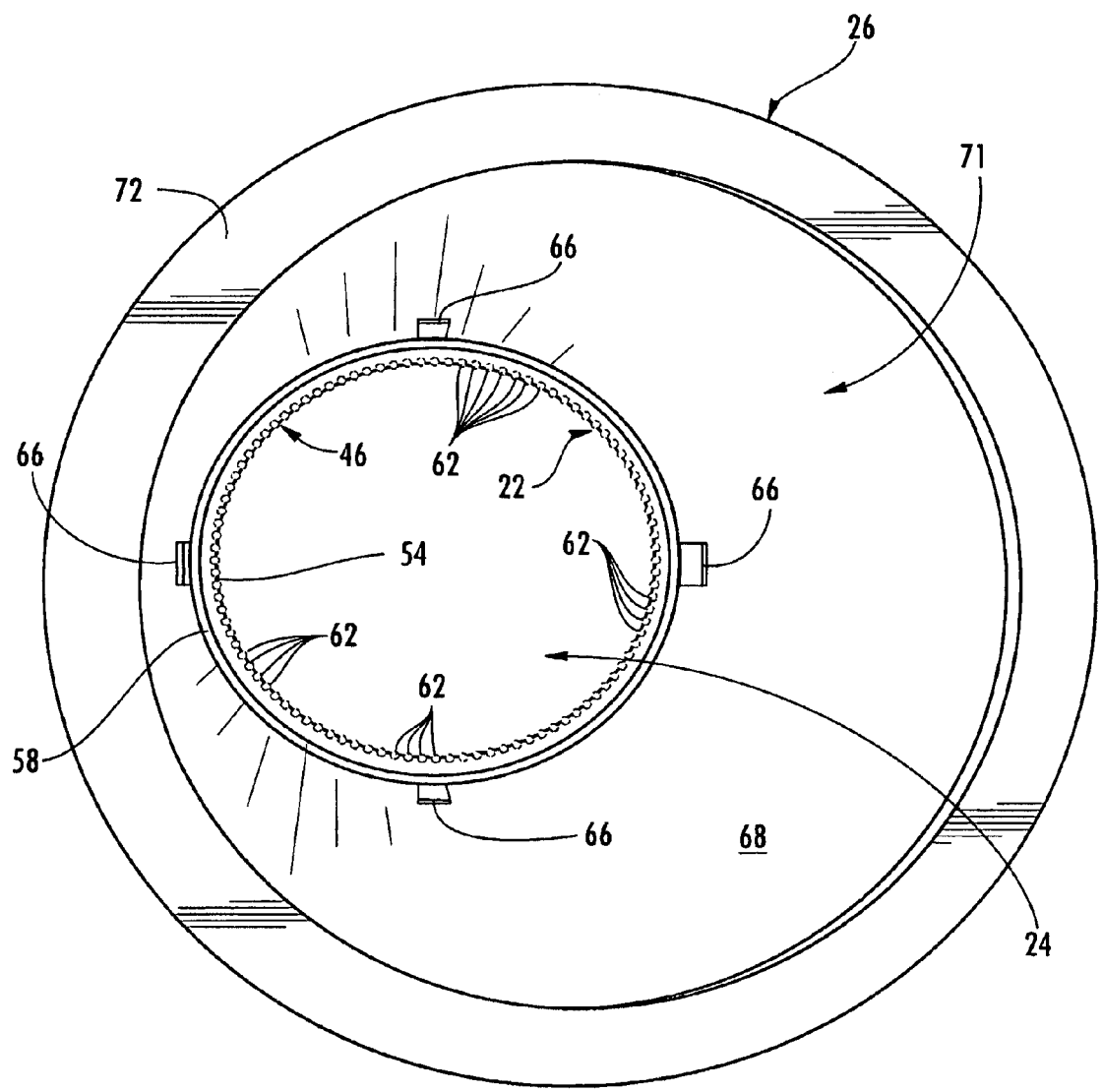
FIG. 11 is a schematic top perspective view of the outer tube mounted to the burner unit, in accordance with the first exemplary embodiment of the present invention, with flames schematically shown emanating from the burner unit.

As best understood with reference to FIG. 6, the outlet end 60 of the injector tube 40 is within the interior of the plenum 46. The outlet end 60 of injector tube 40 is hidden from view within the interior of the plenum 46; therefore, the outlet end of the injector tube is schematically shown by dashed lines in FIG. 6. The gas-air mixture that exits the outlet end 60 of injector tube 40 is within the interior of the plenum and may flow around the combustion cavity 24/inner wall of the plenum 54, as schematically shown by dashed arrows in FIG. 6. The gas-air mixture that has exited the plenum 46 by way of the discharge ports 52 is ignited. The gas-air mixture exiting the plenum may be ignited by a suitable mechanism (not shown), which could be an electric coil, spark or pilot flame, or any combination thereof. The ignited flames that emanate from the ports 52/perforated plates 56 are schematically shown in FIGS. 6, 7 and 11, and a representative few of the flames are designated by the numeral 62.

The burner 42 further includes a frame for supporting the plenum 46, and the frame may be in the form of suitable upright members 64 (e.g., legs) or any other suitable mechanism. The burner 42 typically also includes a series of upright flanges 66 that extend upwardly from the upper wall 58 of the plenum 46. Generally described, the series of upright flanges 66 extends around the upper end of the combustion cavity 24 of the plenum 46. The upright flanges 66 are for use in at least partially mounting the outer tube 26 to the burner 42/plenum 46, as will be discussed in greater detail below. The upright flanges 66 may be omitted or replaced with any other suitable mechanism for at least partially mounting the outer tube 26 to the burner 42/plenum 46.

Figure 9:
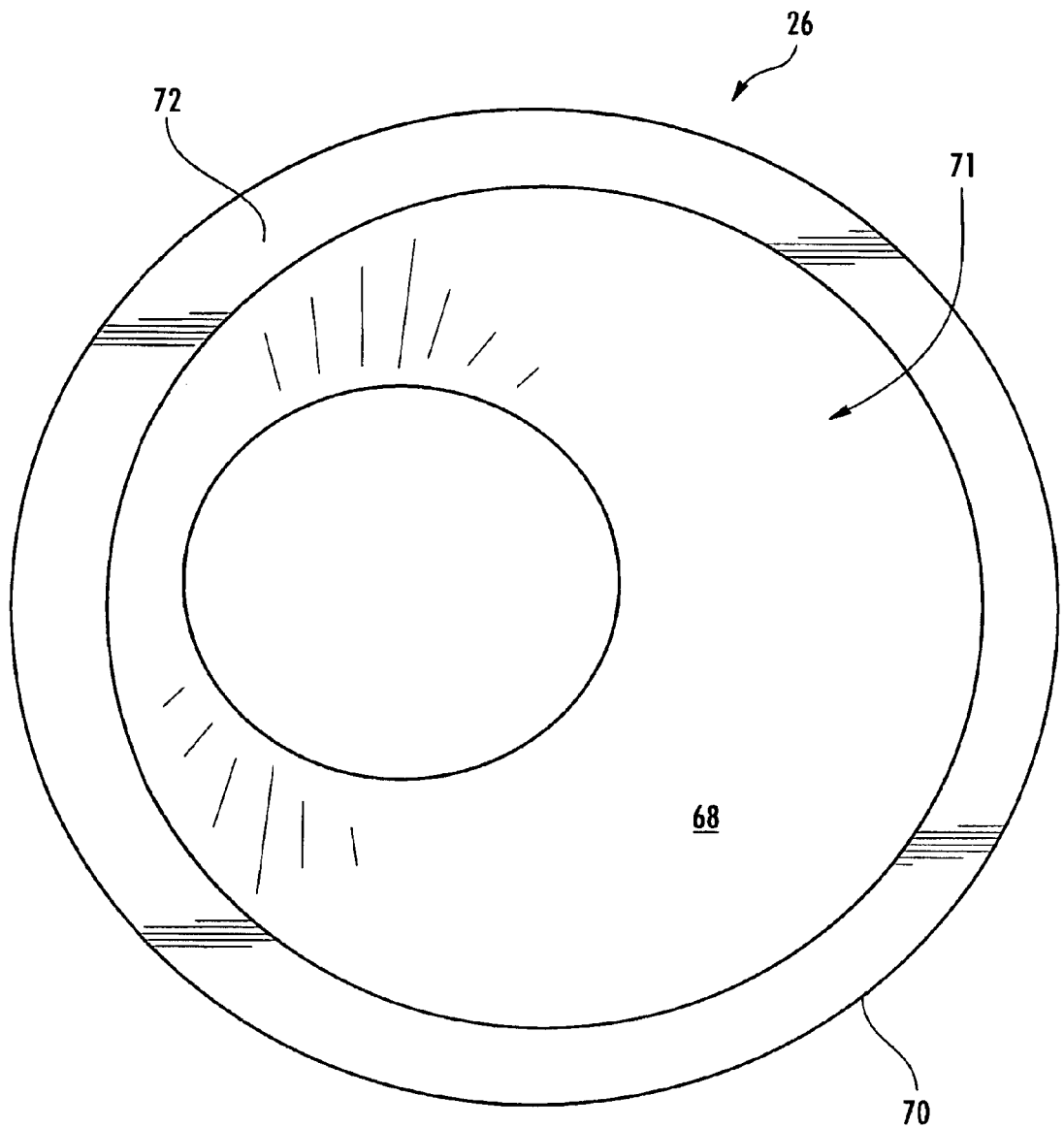
FIG. 9 is an isolated, top perspective view of the outer tube of the radiant tube broiler of FIG. 1.

The outer tube 26 is discussed in greater detail below primarily with reference to FIGS. 2, 3 and 9. The cylindrical outer tube 26 typically has a diameter that is smaller than its length. The outer tube 26 is typically a composite outer tube that includes a cylindrical inner wall 68 that is coaxially surrounded (e.g., substantially surrounded) by a cylindrical outer wall 70. The inner wall 68 of the outer tube 26 extends around and at least partially defines a cavity 71 (FIG. 9) of the outer tube 26. The diameters of the inner and outer walls 68, 70 differ so that an annular chamber is defined between the inner and outer walls of the outer tube 26. The chamber defined between the inner and outer walls 68, 70 of the outer tube 26 is typically filled with an insulating material 69 (FIG. 2) to reduce heat loss to the outside of the radiant tube broiler 20. Similarly, the lid 36 and/or an obstruction that at least partially closes the lower end of the combustion cavity 24 of the burner 42 can also be insulated to reduce heat loss to the outside of the radiant tube broiler 20.

The upper end of the chamber defined between the inner and outer walls 68, 70 of the outer tube 26 can be closed with a plate-like, annular upper wall 72 that has an inner diameter and an outer diameter. The inner diameter of the upper wall 72 is substantially equal to the diameter of both the cylindrical inner wall 68 of the outer tube 26 and the major diameter of the heating cavity 38. The outer diameter of the upper wall 72 is substantially equal to the diameter of the cylindrical outer wall 70 of the outer tube 26. The annular edges of the upper wall 72 are typically respectively mounted to the upper annular edges of the inner and outer walls 68, 70 of the outer tube 26. That is, the flat, ring-like upper wall 72 is mounted to and spans between the upper edges of the inner and outer walls 68, 70 of the outer tube 26.

Similarly, the lower end of the chamber defined between the inner and outer walls 68, 70 of the outer tube 26 can be closed with a plate-like, annular lower wall (not shown) that has an inner diameter that is substantially equal to the diameter of both the cylindrical inner wall 68 of the outer tube 26 and the major diameter of the heating cavity 38, and an outer diameter that is substantially equal to the diameter of the cylindrical outer wall 70 of the outer tube 26. More specifically, the annular edges of the annular lower wall are typically respectively mounted to the lower annular edges of the inner and outer walls 68, 70 of the outer tube 26. That is, the annular lower wall is typically a flat ring that is mounted to and spans between the lower edges of the inner and outer walls 68, 70 of the outer tube 26.

The emitter tube assembly 28 is discussed in greater detail below primarily with reference to FIGS. 2, 4 and 10. The emitter tube assembly 28 includes a disk-shaped, plate-like, lower wall 76; an annular, plate-like flange 78; and a cylindrical emitter tube 80. The emitter tube 80 typically has a diameter that is smaller than its length. The emitter tube 80 extends around and defines the broiling cavity 34. The lower wall 76 and the flange 78 are respectively mounted to opposite upper and lower ends of the emitter tube 80. More specifically regarding the flange 78, it is an annular, upper flange-like rim of the emitter tube assembly 28. The flange 78 has an inner diameter that is substantially equal to both the diameter of the emitter tube 80 and the diameter of the broiling cavity 34. The inner annular edge of the flange 78 is typically mounted to the upper annular edge of the emitter tube 80 so that the flange extends substantially perpendicularly away from proximate the upper edge of the emitter tube.

Generally described, the lower end of the broiling cavity 34 is obstructed by the lower wall 76, and more specifically it is closed (e.g., substantially closed) by the lower wall. The lower wall 76 has a diameter that is substantially equal to both the diameter of the emitter tube 80 and the diameter of the broiling cavity 34. The peripheral annular edge of the lower wall 76 is typically mounted to the lower annular edge of the emitter tube 80. Optionally, the lower wall 76 may include one or more/at least one discharge aperture 81 (FIG. 4), which will be discussed in greater detail below.

In accordance with alternative embodiments of the present invention that are generally like the first exemplary embodiment of the present invention, one or more of the above-described features of the first exemplary embodiment of the present invention may be omitted or modified. For example, the lower wall 76 of the emitter tube assembly 28 may be omitted in some situations or be in the form of a door that may be opened and closed (e.g., when the emitter tube is oriented substantially horizontally rather than upright). Nonetheless, when the emitter tube assembly 28 includes the lower wall 76, the emitter tube assembly may be more specifically characterized as a container with a closed (e.g., substantially closed) bottom, since the lower wall 76 may obstruct, or more specifically close (e.g., substantially close), the lower end of the broiling cavity 34.

Figure 10:
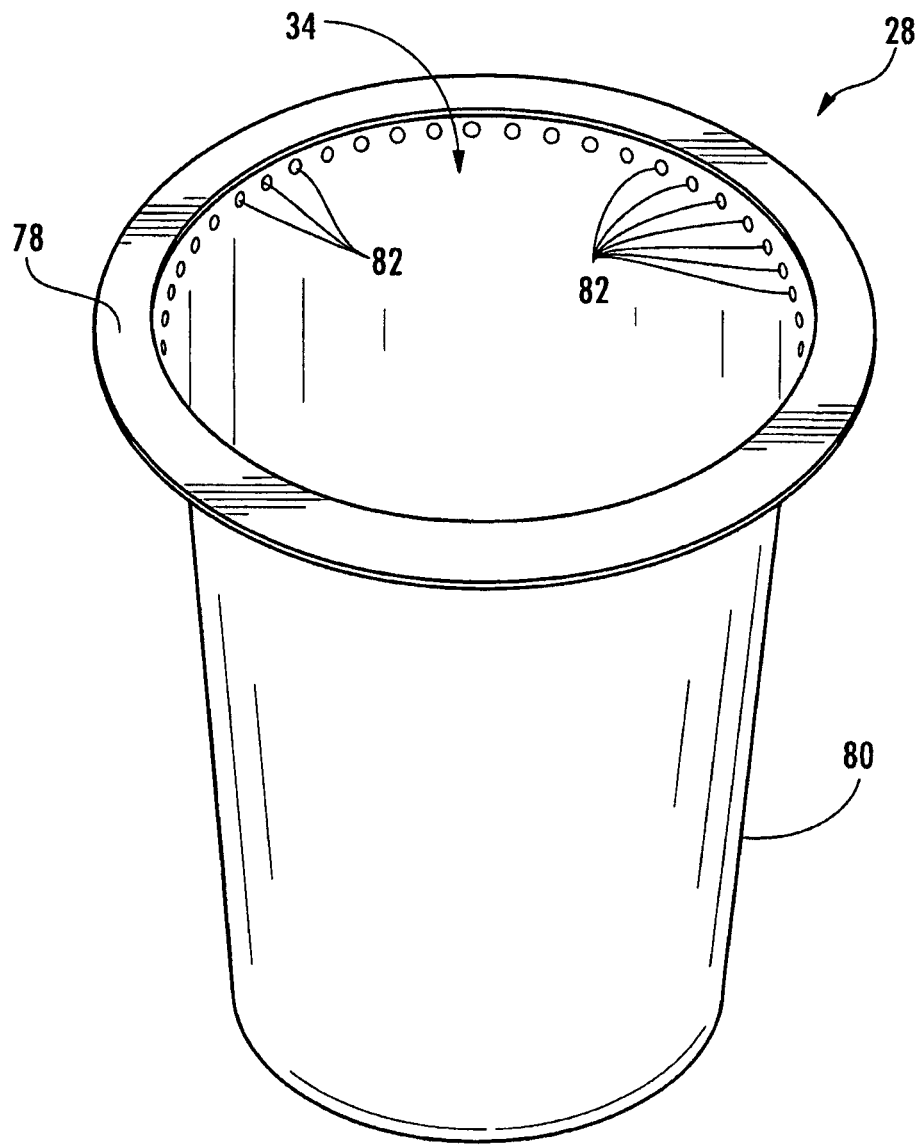
FIG. 10 is an isolated, top perspective view of the emitter tube of the radiant tube broiler of FIG. 1.

FIG. 10 is an isolated, top perspective view of the emitter tube assembly 28 taken generally from a first side. Although symmetry is not required, for ease of explanation it is noted that the emitter tube assembly 28 typically is substantially symmetrical, such that an isolated, top perspective view of the emitter tube assembly 28 taken generally from a second side, which is opposite from the first side, is a mirror image of FIG. 10. This symmetry is noted in an effort to clarify that the emitter tube 80 of the emitter tube assembly 28 includes a continuous series of vent apertures 82 that extends around and substantially encircles the upper end of the broiling cavity 34. The series of vent apertures 82 extend through the upright wall of the emitter tube b at a location close to and below the upper flange 78 of the emitter tube assembly 28. Each of the vent apertures 82 is an opening that extends through the emitter tube 80 so that the vent apertures provide passageways that extend between and are in communication with each of the broiling and heating cavities 34, 38 when the radiant tube broiler 20 is fully assembled, as will be discussed in greater detail below. Only a representative view of the vent apertures b are identified by their reference numeral in the figures, in an effort to clarify the views. Below the vent apertures 82, the emitter tube 80 is in the form of a solid cylindrical wall, so that gasses, water, oil, grease and other residues do not pass through the emitter tube 80 below the vent apertures 82.

An acceptable example of a method of assembling the radiant tube broiler 20 will be described in the following, in accordance with the first exemplary embodiment of the present invention. As best understood with reference to FIG. 5, the lower ends of the legs/upright members 64 of the fully assembled burner unit 22 are placed on a flat, substantially horizontal surface. Then and as best understood with reference to the top perspective view of FIG. 11, the outer tube 26 is coaxially mounted to the burner unit 22. More specifically, the lower end of the outer tube 26 is placed upon the upper wall 58 of the plenum 46 so that the upright flanges 66 extend into the lower end of the cavity 71 of the outer tube. In this configuration, the combustion cavity 24 and the cavity 71 of the outer tube 26 are in communication with one another and coaxial. The upright flanges 66 seek to aid in the coaxial alignment. If desired, the outer tube 26 is fixedly connected to the burner unit 22 by way of brackets, fasteners, welding or any combination thereof, or by any other suitable mechanism. Flames 62 are schematically shown emanating from the burner unit 22 in FIG. 11, as will be discussed in greater detail below. However, it is typical for the control valve 48 (FIGS. 2, 4 and 6) to remain closed in the configuration shown in FIG. 11, so that gas is not supplied from the manifold 47 (FIG. 2)/flames b do not emanate from the burner unit 22 in the partially assembled configuration shown in FIG. 11.

Figure 3:
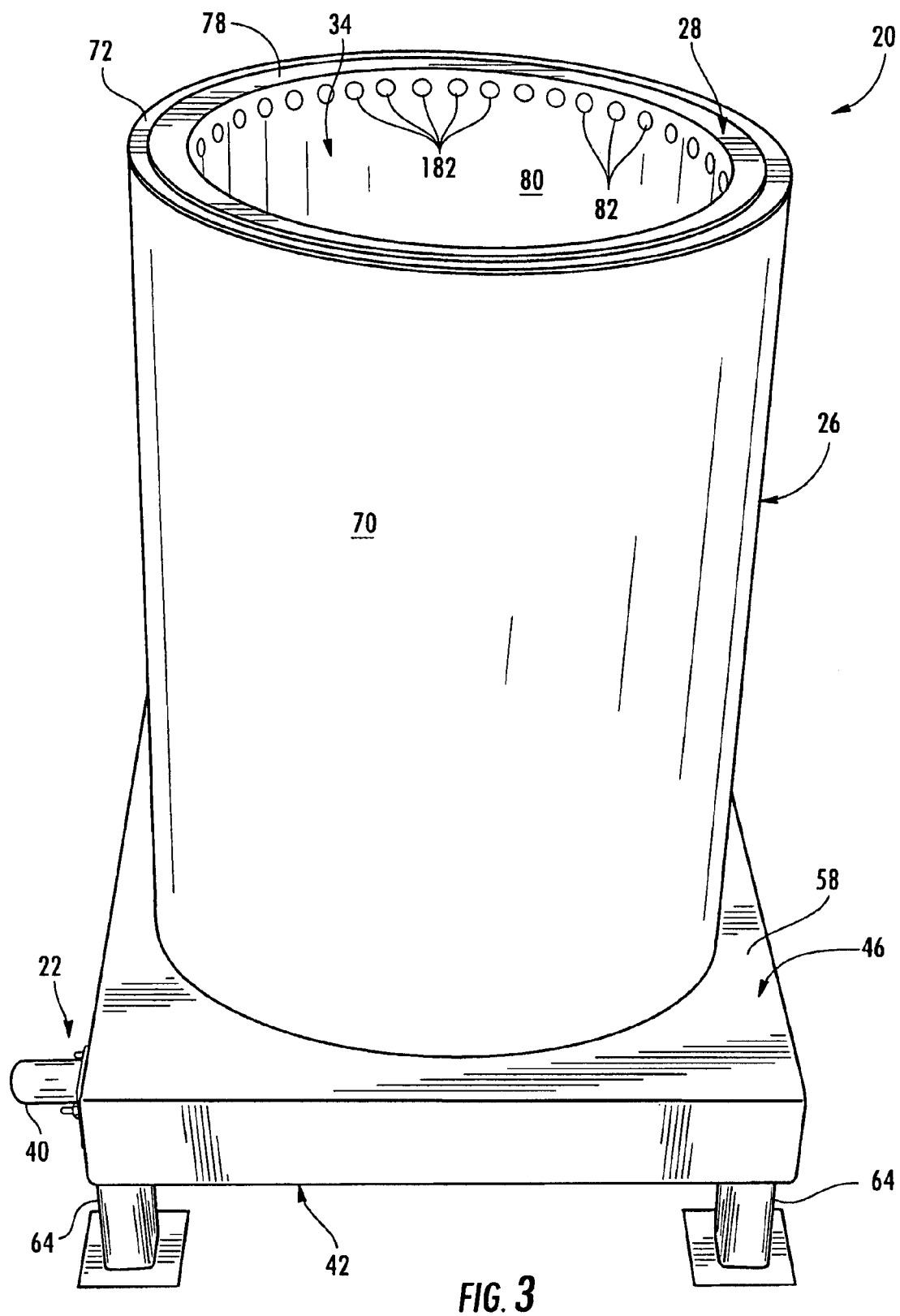
FIG. 3 is a perspective view of the radiant tube broiler of FIG. 1, with its lid, orifice, control valve, adjusting knob and manifold omitted.
Figure 4:
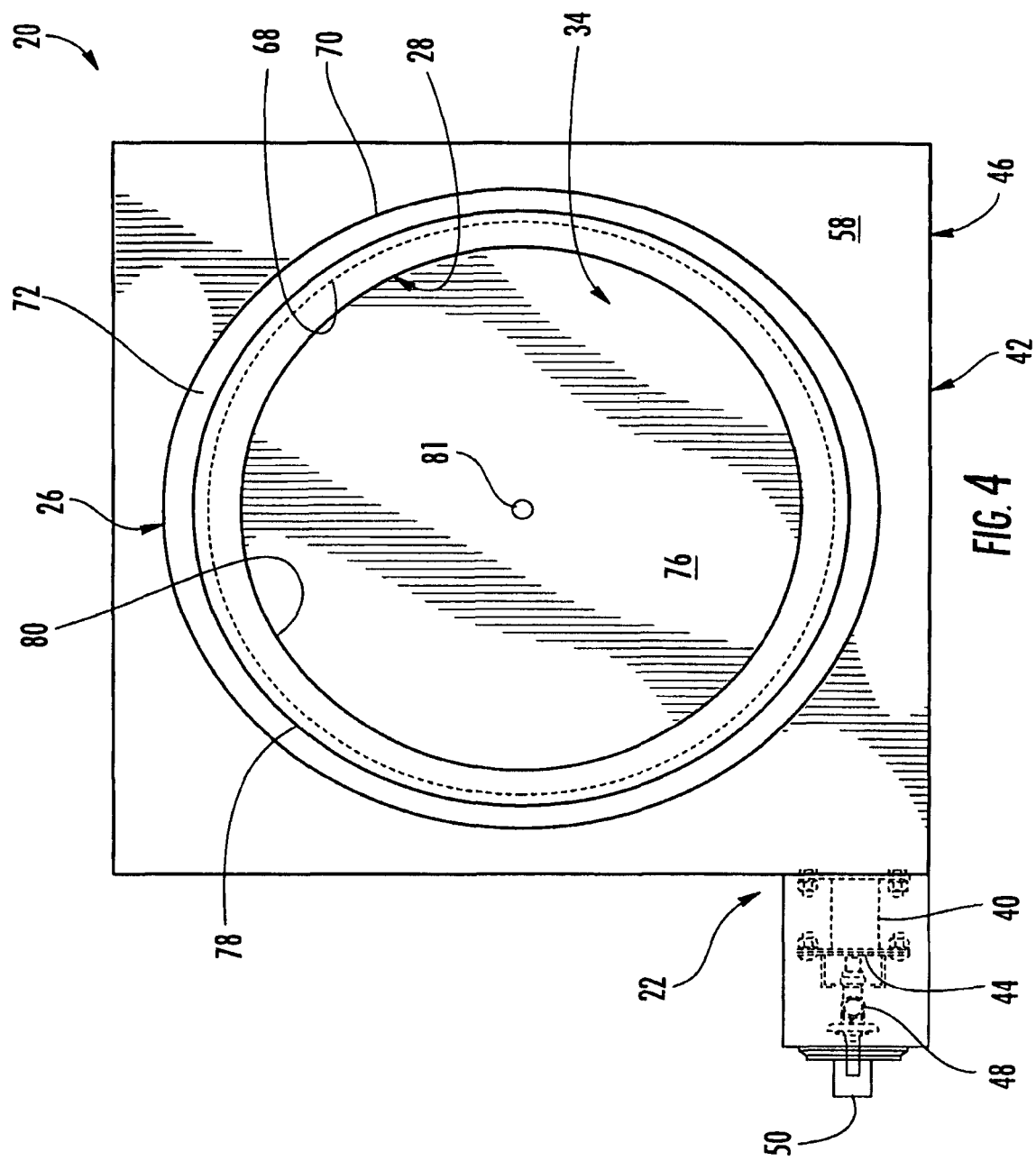
FIG. 4 is schematic top plan view of the radiant tube broiler of FIG. 1, with the lid omitted.

As best understood with reference to FIGS. 3 and 4, after the outer tube 26 is coaxially mounted to the burner unit 22, then the emitter tube assembly 28 is coaxially mounted to the outer tube. More specifically, the lower end of the emitter tube assembly 28 is introduced into the cavity 71 of the outer tube 26, and the emitter tube assembly is lowered into the cavity 71 until the lowering is arrested by engagement between the upper wall 72 of the outer tube and the flange 78 at the top of the emitter tube 80. The upper wall 72 of the outer tube 26 supports the flange 78 such that the emitter tube 80 is suspended by the flange 78. That is, the upper end of the emitter tube assembly 28 includes the annular, outwardly protruding flange 78 that is for sitting upon the upper end of the outer tube 26, such that the emitter tube assembly 28 can be suspended via its upper flange 78. Because the emitter tube 80 is suspended from the outer tube 26 by way of the flange 78, the outer tube 26 can be characterized as being a frame, or part of a frame, for supporting the emitter tube assembly. In accordance with the first exemplary embodiment of the present invention, the emitter tube assembly 28 is removably installed in the outer tube 26, so that the emitter tube assembly 28 may be easily removed for cleaning, as will be discussed in greater detail below. Alternatively, the emitter tube assembly 28 can be fixedly mounted to the outer tube 26 by way of brackets, fasteners, welding or any combination thereof, or by any other suitable mechanism.

The emitter tube assembly 28 is typically coaxially mounted to the outer tube 26 so that a space of about 1 inch is uniformly provided between the outer surface of the emitter tube 80 and the inner surface of the inner wall 68 of the outer tube, and so that a space of about 1 inch is uniformly provided between the outer surface of the emitter tube 80 and the inner wall 54 of the plenum 46. This spacing may be facilitated through the use of suitable spacers (not shown) or any other suitable mechanism. The heating cavity 38 is defined between the outer surface of the emitter tube 80 and the inner surface of the inner wall 68 of the outer tube 26. Typically the heating cavity 38 is an annular passageway (e.g., substantially annular passageway) that extends for the entire length of the outer tube 26 such that the outer surface of the emitter tube 80 and the inner surface of the inner wall 68 of the outer tube 26 are in opposing face-to-face relation with respect to one another. That is, in accordance with the first exemplary embodiment, the outer tube 26 and heating cavity 38 extend all the way around (e.g., substantially all the way around) the emitter tube 80. Nonetheless, the outer tube 26 is configured, for example, so that an open passageway is provided for the hot gasses from the flames 62 to flow into the heating cavity 38, and optionally the flames 62 may extend into the heating cavity.

FIG. 2 schematically shows that the emitter tube b is longer than the outer tube 26, so that the lower end of the emitter tube 80/lower wall 76 of the emitter tube assembly 28 is positioned in the combustion cavity 24 of the burner unit 22. The lower end of the emitter tube 80/lower wall 76 of the emitter tube assembly 28 are schematically shown by dashed lines hidden from view in FIG. 2. Because the lower end of the emitter tube 80/lower wall 76 of the emitter tube assembly 28 is positioned in the combustion cavity 24, the series of discharge ports 52 extends substantially around (e.g., substantially encircles) a lower portion of the emitter tube 80, and the lower wall 76 of the emitter tube assembly 28 is positioned below the series of discharge ports 52, as will be discussed in greater detail below. The lower end of the emitter tube assembly 28 may extend all the way through the combustion cavity 24 of the burner 42, so that the lower wall 76 of the emitter tube assembly 28 is positioned relatively far below the series of discharge ports 52, as will be discussed in greater detail below.

An acceptable example of a method of operating the radiant tube broiler 20 will be described in the following, in accordance with the first exemplary embodiment of the present invention. After the radiant tube broiler 20 has been assembled as described above, the food 32 to be cooked is introduced into the broiling cavity 34. Typically a support member such as, but not limited to, the basket 30, will be used to support the food 32 so that the food is generally centered along the length of the broiling cavity 34, and also to generally center the food with respect to the cylindrical axis of the broiling cavity. More specifically, the basket 30 and food 32 within the broiling cavity 34 may be coaxially aligned with the broiling cavity 34, and typically the items are sized so that the food is not in direct contact with the inner surface of the emitter tube assembly 28. For example and as schematically shown in FIG. 2, the basket 30 can be a generally cylindrical wire basket that is supported by legs or other suitable supports that extend down to, and engage, the lower wall 76 of the emitter tube assembly 28. As mentioned above, the basket 30 and food 32 are hidden from view within the emitter tube 80 in FIG. 2; therefore, they are schematically shown by dashed lines. Also, the lid 36 is typically placed over the open upper end of the broiling cavity 34, as will be discussed in greater detail below.

After the food 32 is in the broiling cavity 34, or at any other appropriate time, the control valve 48 is operated and the gas-air mixture exiting the discharge ports 52 of the burner 42 is ignited to produce the flames 62. The secondary air for combustion is typically supplied from under the burner 42. For example, in the first exemplary embodiment of the present invention, the combustion cavity 24 of the burner 42 is downwardly open, so that the secondary air for combustion is provided by way of the lower annular gap defined between the lower edge of the emitter tuber 80 and the inner wall 54 of the plenum 46. As another example, the lower end of the combustion cavity 24 of the burner 42 may be obstructed by a frame, plate or other structures, in which case passageways, which may be in the form of gaps, perforations or the like, may be provided for supplying the secondary air. The secondary air/secondary air inlets may be provided by any suitable mechanism.

The heating cavity 38, which is defined between the outer surface of the emitter tube 80 and the inner surface of the inner wall 68 of the outer tube 26, can be characterized as a channel or passageway for the hot gases resulting from the flames 62. That is, the hot gasses from the flames 62 rise into the lower annular opening of the heating cavity 38. From the lower annular opening of the heating cavity 38, the hot gasses continue to rise, and thereby they flow upwardly in the heating cavity 38. The flow of hot gases (products of combustion from the flames 62) in the heating cavity 38 is schematically indicated by arrows and identified by reference numeral 84 in FIG. 2. These hot gasses 84 flowing in the heating cavity 38 convectively heat both the inner surface of the inner wall 68 of the outer tube 26 and the outer surface of the emitter tube 80. The flow of heat from the inner wall 68 is typically retarded or minimized by the optional insulation 69 installed between the walls 68, 70 of the outer tube 26, or by an air gap between the walls 68, 70 of the outer tube 26. In accordance with the first exemplary embodiment of the present invention, a combustion air blower, or the like, is not used, so that the convective heat transfer in the heating cavity 38 is substantially by way of natural heat convention (free convention), rather than forced convection. Alternatively, a combustion air blower may be used.

Heat is conducted through the emitter tube 80 (e.g., through the wall that is the emitter tube), from the emitter tube's outer surface, which faces and partially defines the heating cavity 38, to the emitter tube's inner surface, which faces, extends around and defines the broiling cavity 34. As a result, the inner surface of the emitter tube 80 is heated and infrared radiant energy is emitted therefrom into the broiling cavity 34. Some of the infrared radiant energy emitted from the inner surface of the emitter tube 80 is absorbed by the food 32 contained within the basket 30 that is within the broiling cavity 34. In accordance with the first exemplary embodiment of the present invention, below the vent apertures 82, the emitter tube 80 is constructed of a solid wall that extends all the way along and around the broiling cavity 34, and the top and bottom ends of the broiling cavity are substantially closed by the lid 36 and the lower wall 76, respectively. Therefore, the broiling cavity 34 is essentially (e.g., substantially) a closed cavity into which the infrared radiant energy is emitted, so that the infrared radiant energy approaches black body conditions.

As mentioned above, the outwardly protruding flange 78 of the emitter tube assembly 28 sits upon the upper end of the outer tube 26, or more specifically the flange 78 may sit upon the upper annular wall 72 of the outer tube. In accordance with the first exemplary embodiment of the present invention, the upper flange 78 of the emitter tube assembly 28 forms at least somewhat of a seal against the upper end of the outer tube 26. More specifically, the upper flange 78 substantially seals against the annular wall 72, the upper end of the inner wall 68 and/or the upper end of the outer wall 70. As a result, when the hot gasses 84 flowing upwardly in the heating cavity 38 reach the vent apertures 82 in the emitter tube assembly 28, the hot gasses 84 enter the upper end of broiling cavity 34 via the vent apertures 82.

Once the hot gasses 84 enter the upper end of broiling cavity 34, they can be characterized as hot exhaust gasses. The hot exhaust gasses are schematically indicated by arrows and identified by reference numeral 86 in FIG. 2. Like the hot gasses 84, the hot exhaust gasses 86 flow upwardly (typically they will not flow downwardly to come into contact with the food 32). The exhaust gases 86 exit out of the top end of the broiling cavity 34 by way of an exhaust opening 88 (e.g., exhaust gap) defined between the upper flange 78 of the emitter tube assembly 28 and the lid 36. More specifically and as shown in FIG. 2, the lid 36 is obstructing (e.g., partially closing) the otherwise open upper end of the broiling cavity 34/emitter tube assembly 28, such that the exhaust opening(s) 88 are defined between the upper flange 78 of the emitter tube assembly 28 and the lid 36. For example, a series of downwardly extending spacers 90 can be mounted to and extend downwardly from the lid 36 so that the spacers engage the upper surface of the upper flange 78 of the emitter tube assembly 28 in a manner so that the lid 36 is vertically spaced apart from the upper end of the emitter tube assembly 28 to allow the exhaust gases 86 to escape through the vertical gap(s)/exhaust opening(s) 88 that are in communication with the broiling cavity 34. A wide variety of other arrangements, such as arrangements for venting exhaust gases 86, are within the scope of the present invention.

Vapors from the cooking process (e.g., from the food 32) are exhausted with the exhaust gases 86 out the upper end of the broiling cavity 34, through the exhaust opening(s) 88. In contrast, oils and juices that may be produced during the cooking process (e.g., from the food 32) typically fall to the lower wall 76 that obstructs the lower end of the broiling cavity 34. The oils and juices may flow through the discharge aperture 81 that extends through the lower wall 76 of the emitter tube assembly 28. The discharge aperture 81 may be fitted with a discharge tube 92 that directs the flowing oils and juices to a tray or container 94 where they may be collected.

As mentioned above, the lower wall 76 of the emitter tube assembly 28 is typically positioned below the series of discharge ports 52, so that the flames 62 and resulting hot gasses 84 do not come into contact with the lower wall 76 of the emitter tube assembly 28. As a result, the lower wall 76 of the emitter tube assembly 28 typically does not become as hot as the emitter tube 80 of the emitter tube assembly, and most of the infrared radiant energy emitted into the broiling cavity 34 is from the inner surface of the emitter tube 80. That is and depending upon how far the lower wall 76 is below the discharge ports 52, flames 62, and hot gasses 84, as well as the heat conducting characteristics of the emitter tube assembly 28, the lower wall 76 may be maintained relatively cool as compared to the emitter tube 80. The lower wall 76 may be maintained relatively cool as compared to the emitter tube 80 in an effort to avoid flare up or uncontrolled burning of any oils that reach the lower wall 76, particularly if the discharge aperture 81 is omitted from the lower wall 76 or becomes plugged. However, even if flare up or uncontrolled burning occurs on the upper surface of the lower wall 76, in accordance with one acceptable method, the flame may be extinguished with a small amount of water because the emitter tube assembly 28 is generally container-like such that a small amount of water contained in the lower region of the emitter tube assembly 28/broiling cavity 34 is converted to steam to extinguish the flame. That is, the emitter tube assembly 28 is typically constructed of a material (e.g., metal, such as stainless steel) that will not break during performance of the procedure described immediately above.

As mentioned above, below the vent apertures 82, the emitter tube 80 is constructed of a solid wall that extends all the way along and around the broiling cavity 34, the hot gasses 84 from the flames 62 do not enter the lower end of the broiling cavity, and the hot gasses 84 that enter the upper end of the broiling cavity 34 typically continue to rise and exit the broiling cavity by way of the exhaust openings 88 substantially without contacting the food 32 within the broiling cavity 34. Accordingly, the hot gases 84 from the flames 62 and heating cavity 38 are directed away from the food 32 within the broiling cavity 34. That is and in accordance with a version of the first exemplary embodiment of the present invention, the hot products of combustion (which have a drying effect) are substantially prevented from contacting the food 32 within the broiling cavity 34, so that the food within the broiling cavity is cooked with almost 100% infrared radiant energy that originates from the inner surface of the emitter tube 80 (e.g., the food 32 within the broiling cavity 34 is cooked with substantially 100% infrared radiant energy). That is, when the food 32 within the broiling cavity 34 is cooked, the cooking that occurs by way of convection and conduction is negligible, although the basket 30 will typically become hot enough so that the basket forms some grid-shaped sear marks on the food. In addition, the lower wall 76 of the emitter tube assembly 28 obstructs or more specifically closes (e.g., substantially closes, such as when the discharge aperture 81 is present) the lower end of the broiling cavity 34, so that any updraft in the broiling cavity 34 below the series of vent apertures 82 is substantially eliminated. That is, the emitter tube assembly 28 is adapted in a manner that seeks to substantially eliminate any updraft in the vicinity of the food 32, which seeks to eliminate cooling and drying of the food, and may also substantially minimize the amount of oxygen that is available for causing any flare up or uncontrolled burning of any oils that reach the lower wall 76, particularly if the discharge aperture 81 is omitted from the lower wall 76.

The basket 30 is typically removably positioned in the broiling cavity 34. Therefore, after the food 32 is cooked and the lid 36 is removed, the food may be retrieved by pulling the basket 30 out of the open upper end of the broiling cavity 34.

As mentioned above, the emitter tube assembly 28 of the first exemplary embodiment is generally shaped like a container (e.g., an upwardly-open can). In accordance with one example of a method of operation described in the following, the upwardly-open, can-shaped emitter tube assembly 28 may simplify the cleaning process. After cooking, any debris in the upwardly-open, can-shaped emitter tube assembly 28 may be removed by removing the upwardly-open, can-shaped emitter tube assembly from radiant tube broiler 20 and inverting it. Also, the removed upwardly-open, can-shaped emitter tube assembly 28 may be scraped to remove any residue. Thereafter, the upwardly-open, can-shaped emitter tube assembly 28 may be placed back into the radiant tube broiler 20, namely placed back into the cavity 71 of the outer tube 26, as discussed above.

In accordance with another acceptable method, the broiling cavity 34 of the upwardly-open, can-shaped emitter tube assembly 28 can have charcoal or wood chips placed therein, so that the charcoal or wood chips can be ignited from the energy of the emitter tube 80. Cooking (e.g., broiling) of the food can then be accomplished by burning the charcoal or wood alone by turning off the burner 42, or a combination of the methods of broiling can be used by leaving the burner on. As another example, the radiant tube broiler 20 may be used as a smoker by placing wood chips of the desired flavor in the upwardly-open, can-shaped emitter tube assembly 28 while broiling.

Figure 12:
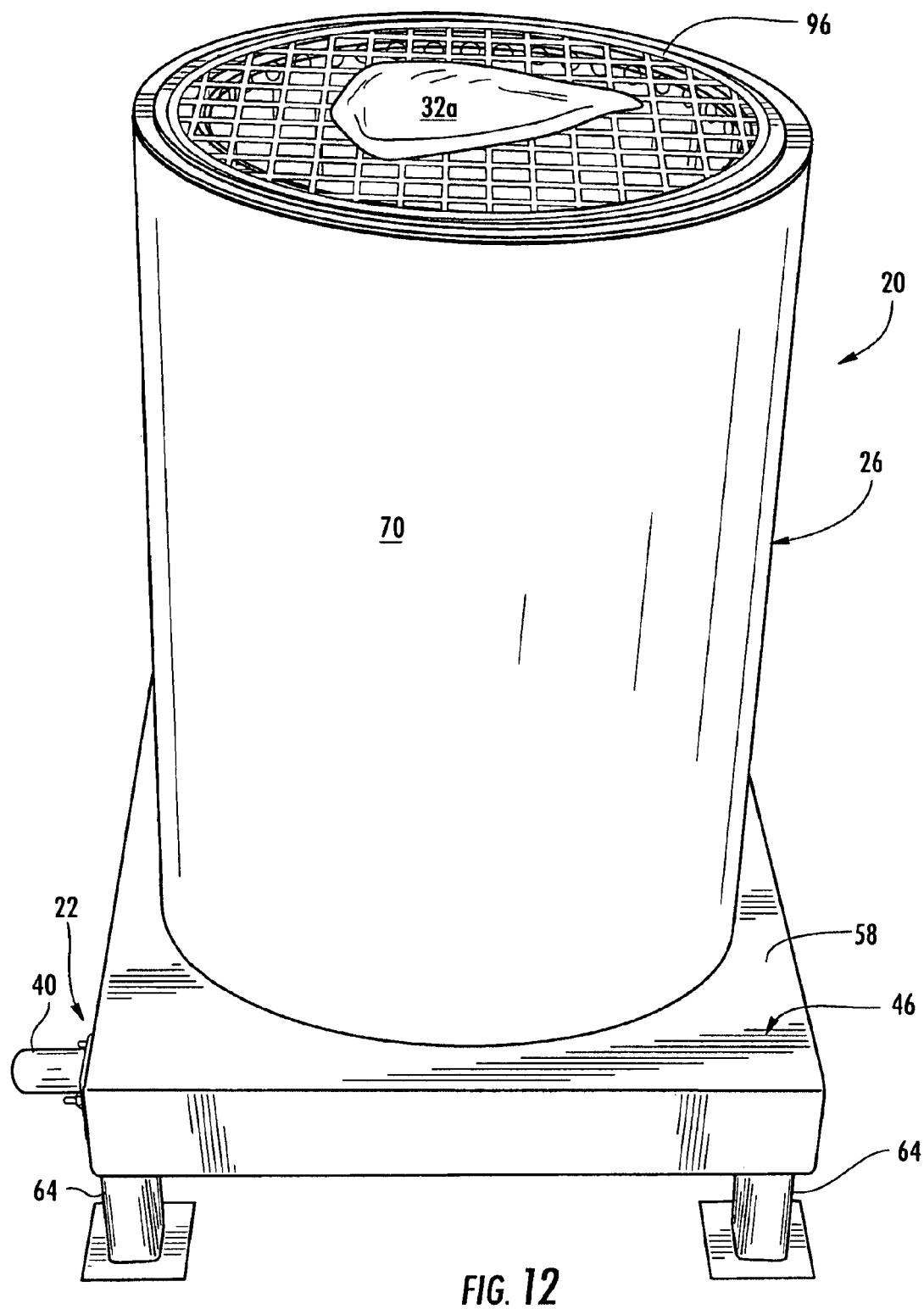
FIG. 12 is like FIG. 1, except that the radiant tube broiler is being used to cook food with a cooking grid mounted at the upper, open end of the radiant tube broiler.

As best understood with reference to FIG. 12 and in accordance with another exemplary method of use, with the radiant tube broiler 20 of the first exemplary embodiment in a fully assembled configuration except for having the lid 36 removed, a cooking grid 96 or other support for food may be laid across the open upper end of the emitter tube assembly 28, and food 32a may be placed upon the cooking grid. In this configuration, the infrared energy within the broiling cavity 34 exits from the upper open end of the broiling cavity and passes through the cooking grid 96 to cook the food 32a. In this configuration, the broiling cavity 34 can be characterized as acting as a black body generator of infrared energy and the infrared radiant energy is distributed substantially uniformly over the cooking grid 96.

The cooking grid 96, which is typically metal (e.g., stainless steel or any another suitable material) typically includes multiple longitudinal members that are spaced apart from one another in a lateral direction, and multiple lateral members that extend in the lateral direction and are spaced apart from one another in the longitudinal direction. The cooking grid 96 shown in the FIG. 12 is one example of an acceptable support member for supporting food being cooked, and the cooking grid can be replaced with a wide variety of grids or other devices for supporting the food, such as a rotisserie or any other type of support member for supporting food. That is, the cooking grid 96 may be more generally characterized as a support member for supporting the food 32a.

Second Exemplary Embodiment

Figure 13:
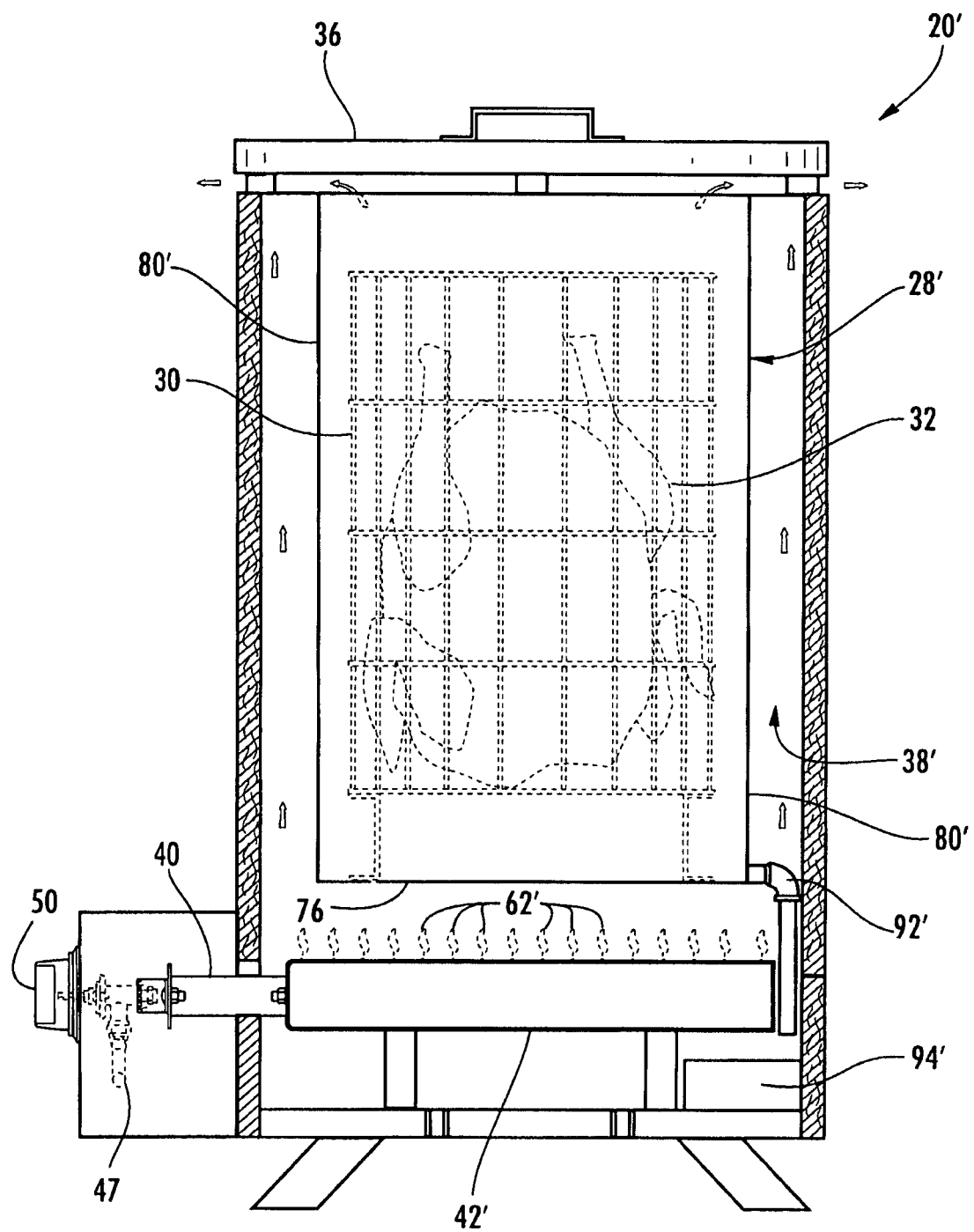
FIG. 13 is a schematic side view of the radiant tube broiler, with its outer tube vertically sectioned so that half of the outer tube has been removed to show an emitter tube, and a basket that is supporting food within the emitter tube is hidden from view and schematically shown by dashed lines, in accordance with a second exemplary embodiment of the present invention.

FIG. 13 is a schematic, partially vertically cross-sectioned view of a cooking apparatus that is in the form of a radiant tube broiler 20' and is described in the following, in accordance with a second exemplary embodiment of the present invention. The radiant tube broiler 20' of the second exemplary embodiment of the present invention is like the radiant tube broiler 20 of the first exemplary embodiment of the present invention, except for variations noted and variations that will be apparent to those of ordinary skill in the art.

As shown in FIG. 13, the burner 42' is mounted beneath the lower wall 76' of the emitter tube assembly 28'. To decrease the energy transferred to the lower wall 76' of the emitter tube assembly 28', a plate (not shown) could be placed above the burner 42', so that the plate is positioned between the burner 42' and the lower wall 76' of the emitter tube assembly 28'. As a result of including such a plate, hot gasses from the flames 62' would flow upwardly and past the edge of the plate, and then into the heating cavity 38'.

As best understood with reference to FIG. 13, the discharge aperture (e.g., see the discharge aperture 81 of FIG. 4) is omitted from the lower wall 76', so that the lower wall 76' may be completely absent of discharge apertures or other openings. In contrast, a discharge aperture (not shown, but for example see the discharge aperture 81 of FIG. 4) extends through a lower portion of the emitter tube 80'. Oils and juices that may be produced during the cooking process (e.g., from the food 32) typically fall to the lower wall 76' that obstructs the lower end of the broiling cavity. These oils and juices may flow through the discharge aperture that extends through a lower portion of the emitter tube 80'. The discharge aperture that extends through a lower portion of the emitter tube 80' is typically fitted with a discharge tube 92' that directs the flowing oils and juices to a tray or container 94' where they may be collected.

Figure 14:
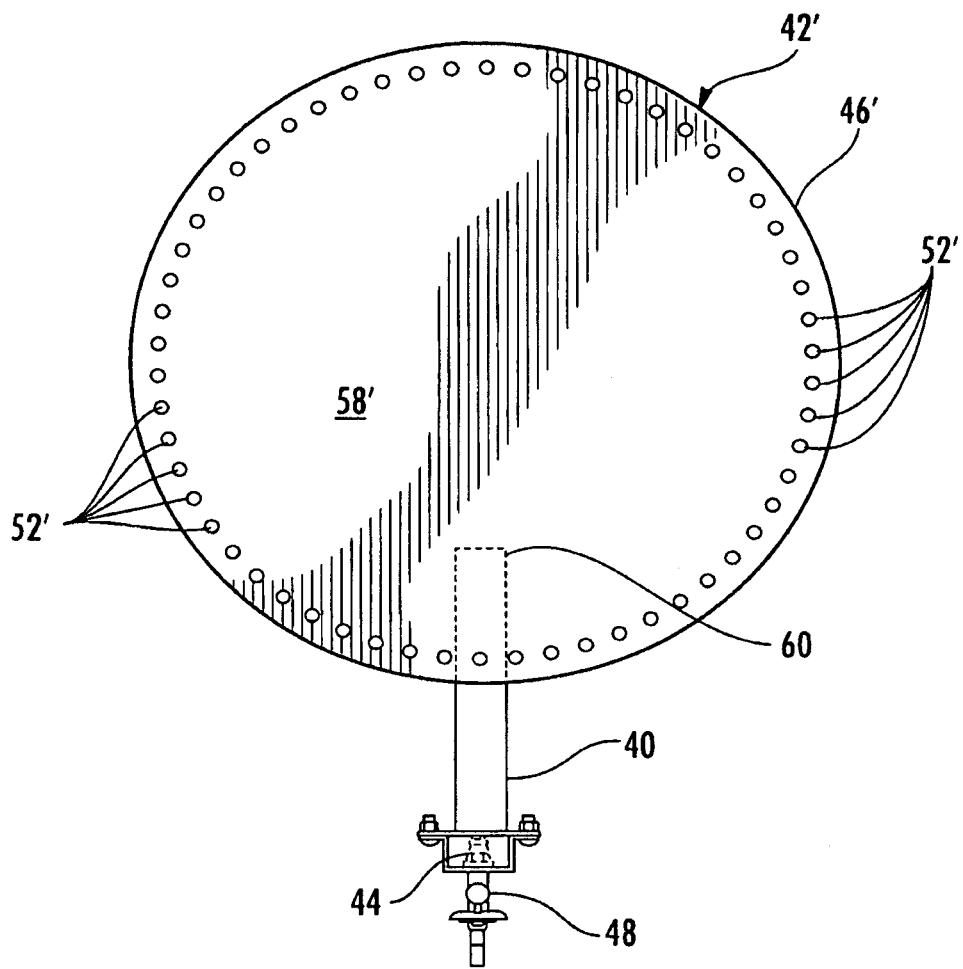
FIG. 14 is a schematic, isolated top plan view of the burner of FIG. 13.
Figure 15:
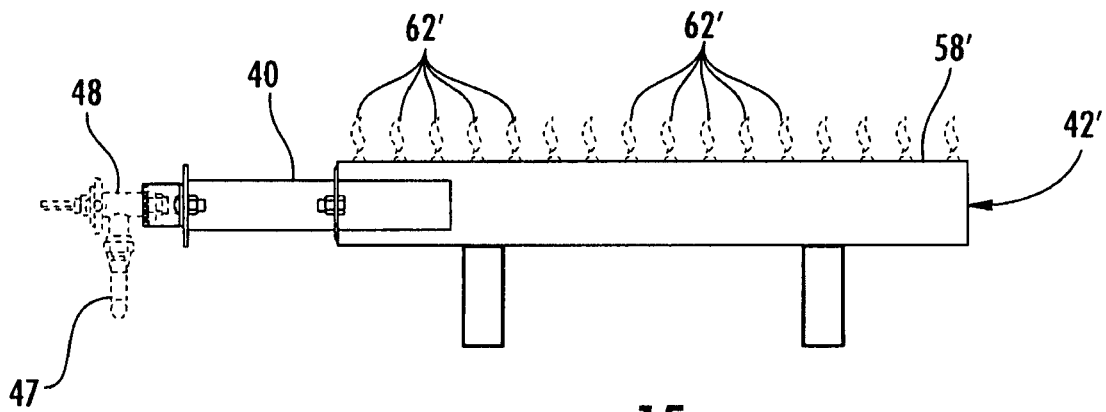
FIG. 15 is a schematic, isolated, side view of the burner of FIG. 13.

As best understood with reference to FIG. 14, the burner 42' has a disk-shaped plenum 46', and the outlet end 60 of the injector tube 40 is within the interior of the plenum 46. The outlet end 60 of injector tube 40 is hidden from view within the interior of the plenum 46'; therefore, the outlet end of the injector tube is schematically shown by dashed lines in FIG. 14. The series of discharge ports 52' extend through the circular upper wall 58' of the plenum 46' and are proximate the periphery of the upper wall 58'. The flames 62' respectively emanate from the discharge ports 52'.

Third Exemplary Embodiment

Figure 16:
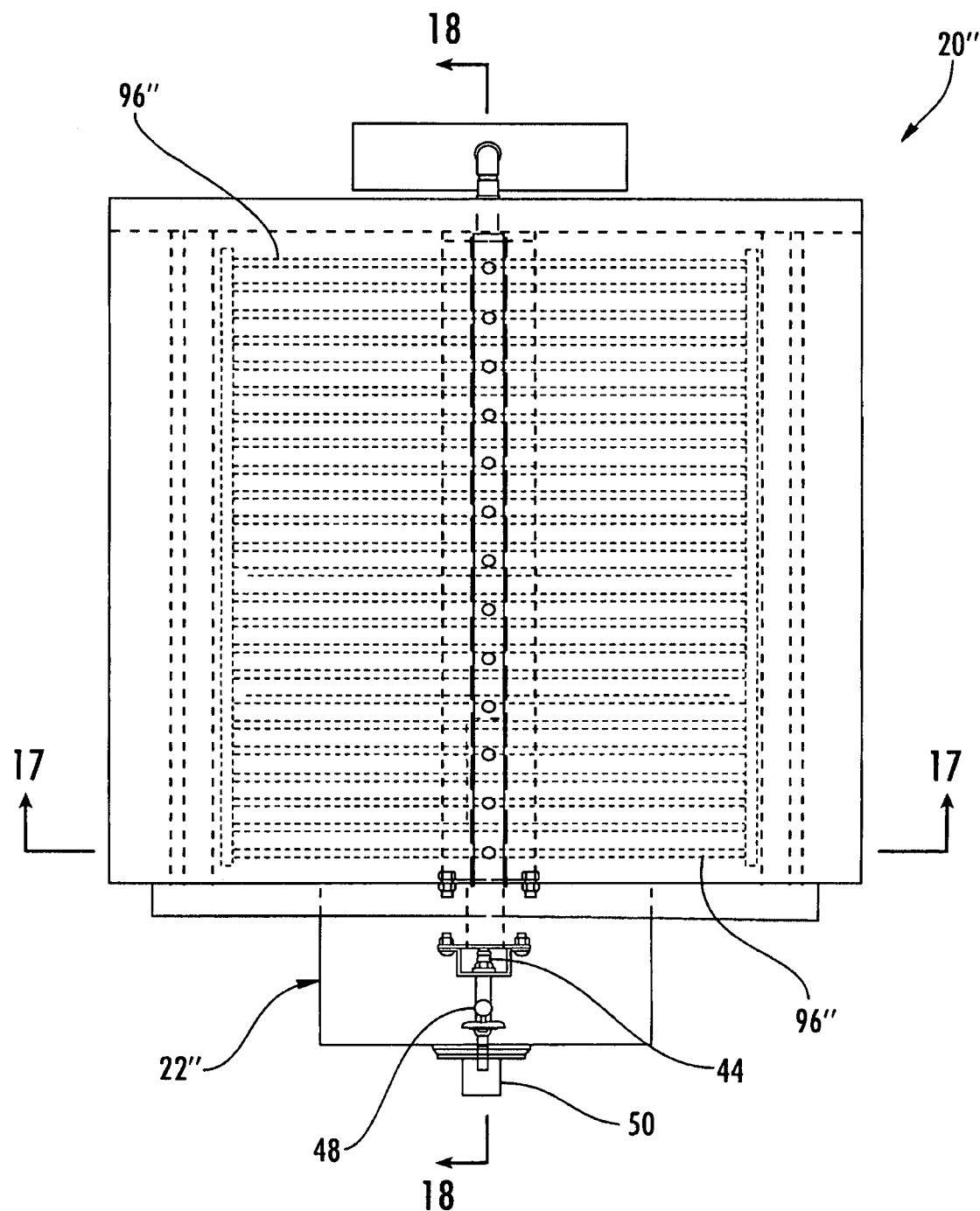
FIG. 16 is a schematic top plan view of a horizontally mounted radiant tube broiler, in accordance a third embodiment of the present invention.
Figure 17:
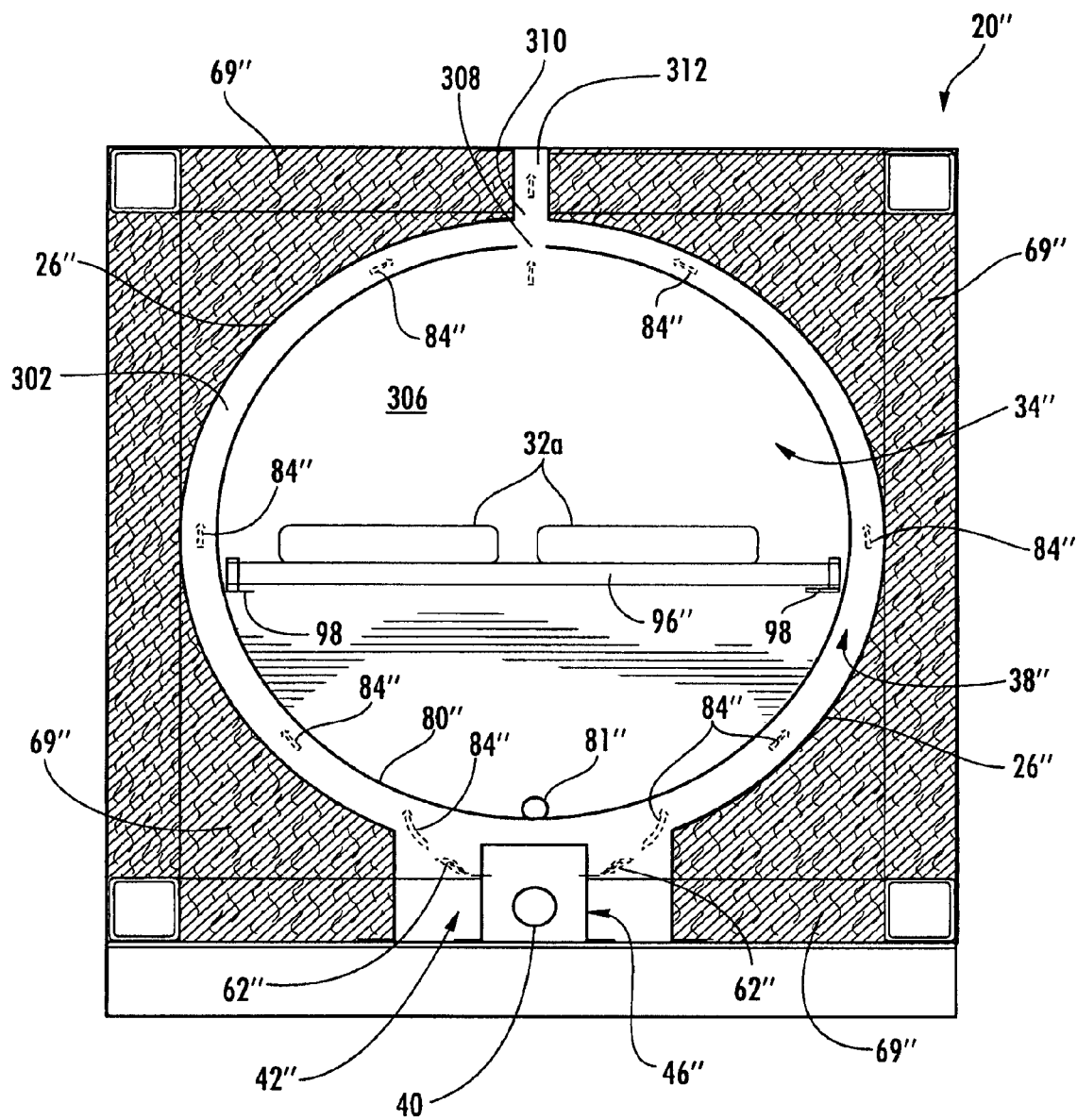
FIG. 17 is a schematic, cross-sectional view, with the cross section taken along line 17-17 of FIG. 16.
Figure 18:
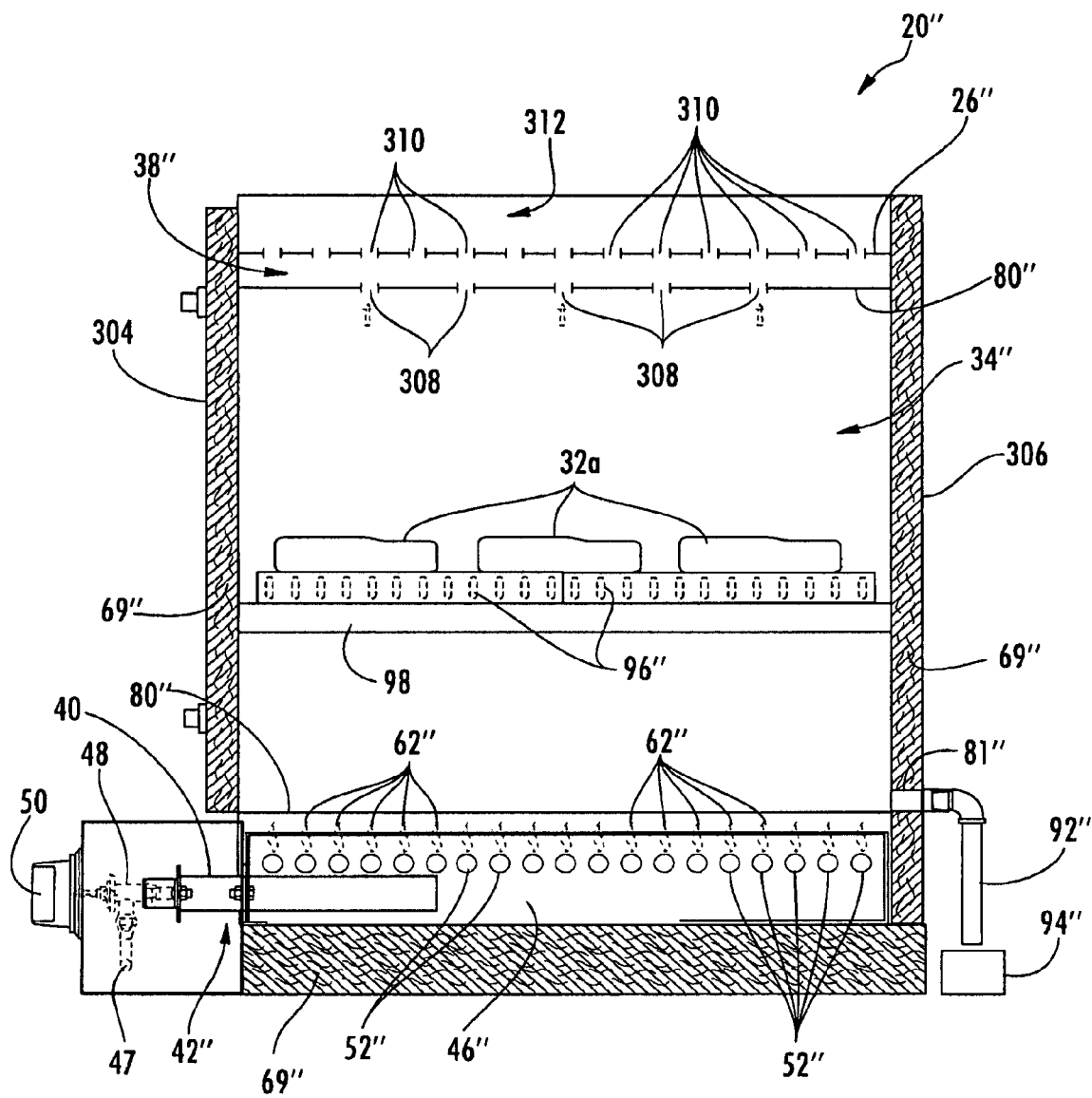
FIG. 18 is a schematic, cross-sectional view, with the cross section taken substantially along line 18-18 of FIG. 16.
Figure 19:
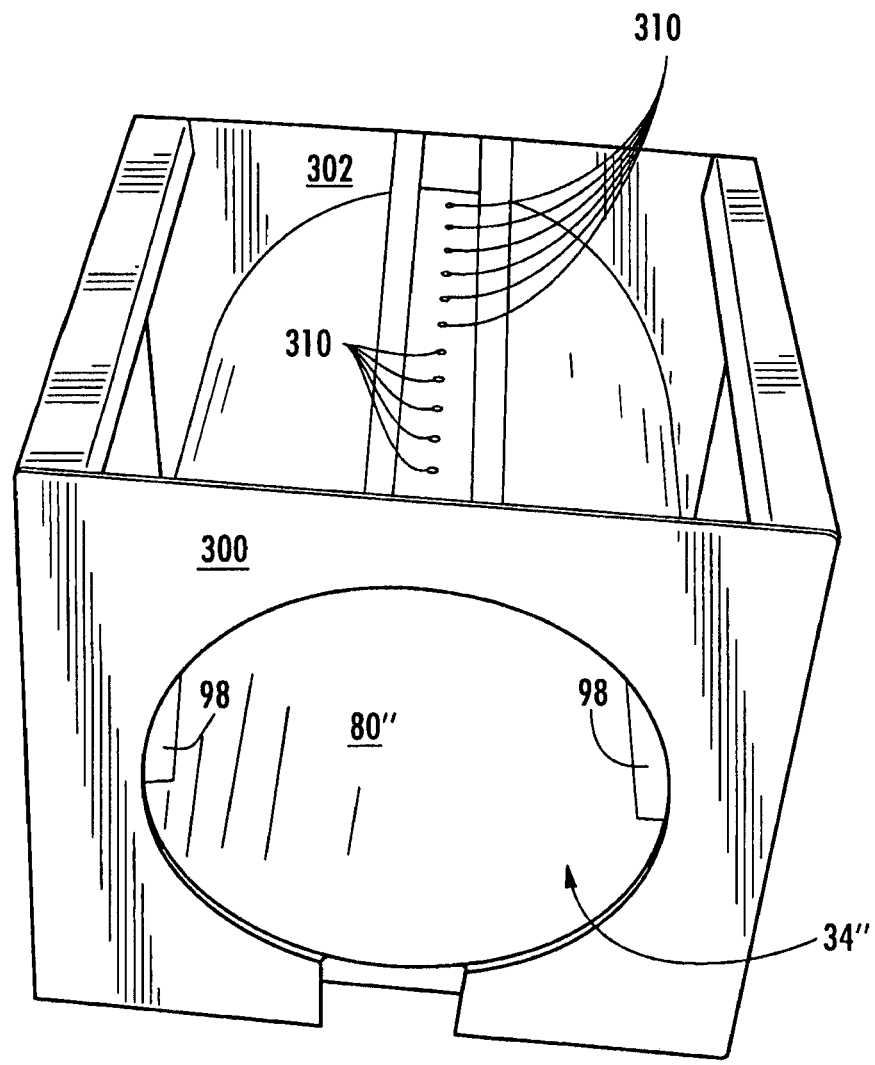
FIG. 19 illustrates the horizontally mounted radiant tube broiler of FIG. 16 with the outside coverings, insulation, cooking grids and burner unit removed.

A horizontally mounted radiant tube broiler 20" of a third exemplary embodiment of the present invention is like the radiant tube broilers 20, 20' of the first and second exemplary embodiments of the present invention, except for variations noted and variations that will be apparent to those of ordinary skill in the art. FIG. 16 is a schematic top plan view of the horizontally mounted radiant tube broiler 20". FIGS. 17 and 18 are schematic, cross-sectional views of the radiant tube broiler 20". For example, FIG. 17 is substantially representative of all vertical cross-sections through the radiant tube broiler 20" that are taken through the broiling cavity 34" and perpendicular to the axis of the broiling cavity. FIG. 19 illustrates the horizontally mounted radiant tube broiler 20" with the outside coverings, insulation 69", cooking grids 96" and burner unit 22" removed.

The cooking grids 96", which can be more generally characterized as support members for supporting the food 32a, are supported by or otherwise mounted to opposite side flanges 98 that are mounted to the emitter tube 80" and protrude into the horizontally extending broiling cavity 34". The cooking grids 96" can be replaced with a wide variety of grids or other devices for supporting the food, such as a rotisserie or any other type of support member for supporting food. For example, the cooking grids 96" can also be characterized as being illustrative of a conveyor with a grid-like "endless conveyor belt", or the like, (e.g., for both supporting and transporting the food 32a, or the like, through the broiling cavity 34").

In accordance with the third exemplary embodiment of the present invention, the front and rear ends of the horizontally extending heating cavity 38" may be closed (e.g., substantially closed) with front and rear walls 300, 302, respectively. Similarly, the open front and rear ends of the horizontally extending broiling cavity 34" may be closed (e.g., substantially closed) with front and rear walls 304, 306, respectively one or both of which may be in the form of openable and closable doors or any other suitable structures. Alternatively, the front and rear ends of the broiling cavity 34" may remain open for accommodating a conveyor that extends through the broiling cavity.

The plenum 46" of the burner 42" is typically fully closed, except for being open to the injector tube 40 and having a series of side discharge ports 52" that extend along (e.g., are defined through) the opposite right and left upright walls of the plenum. The side discharge ports 52" may be covered with screens or perforated plates, as discussed above. In order to minimize flare up, it may be desirable to lower the temperature at the lowest region of the emitter tube 80", since the residue (e.g., oils and juices) from the broiling process will tend to flow to the lowest position of the emitter tube. In accordance with the third exemplary embodiment of the present invention, while the radiant tube broiler 20" is fully operating (e.g., operating at high fire), the temperature at the lowest position of the emitter tube 80" is lower than the temperature at adjacently outwardly positions/relatively higher regions of the emitter tube because, for example, the burner 42" employs the plenum 46" with the side discharge ports 52" as opposed to ports on top of the plenum. For example, the width (e.g., distance from the right to the left upright walls) of the plenum 46" can be varied to control the width of this optional relatively "cool zone" of the emitter tube 80". The relatively cool zone is typically positioned at the relatively lower, central region of the emitter tube 80", so that the relatively lower, central region is maintained at a lower temperature than relatively higher region(s) of the emitter tube 80". The relatively cool zone seeks to eliminate flare up, especially when the cool zone is (e.g., typically the cool zone is) maintained at a temperature below the ignition temperature of the residues (e.g., oils) that are discharged from the cooking process. An example of a burner/plenum with side ports that may be used to maintain a relatively cool zone is disclosed in U.S. patent application Ser. No. 11/903,818, which was filed Sep. 25, 2007, by Willie H. Best. The entire disclosure of U.S. patent application Ser. No. 11/903,818, which was filed Sep. 25, 2007, by Willie H. Best, is incorporated herein by reference.

The hot gasses from the flames 62", which emanate from the burner's side discharge ports 52", flow into respective lower right and left elongate openings to the heating cavity 38" by passing through an elongate opening at the bottom of the outer tube 26". Nonetheless and as shown in FIG. 17, the outer tube 26" substantially surrounds the emitter tube 80". From the lower elongate openings of the heating cavity 38", the hot gasses continue to rise, and thereby they flow upwardly in the heating cavity 38". The flow of hot gases (products of combustion from the flames 62") in the heating cavity 38" is schematically indicated by arrows and identified by reference numeral 84" in FIG. 17.

A series of inner vent apertures 308 extend through the emitter tube 80", along the length of the emitter tube and at the apex of the emitter tube. The inner vent apertures 308 exhaust gasses (e.g., steam from the food being cooked) into the upper region of the heating cavity 38". A series of outer vent apertures 310 extend through the outer tube 26", along the length of the outer tube and at the apex of the outer tube. Nonetheless and as shown in FIG. 17, the outer tube 26" substantially surrounds the emitter tube 80". The outer vent apertures 310 typically exhaust into an upwardly open slot 312, which is typically open to the ambient atmosphere or an exhaust hood or any other suitable mechanism. Alternatively, the outer vent apertures 310 may themselves extend all the way to the exterior of the radiant tube broiler 20". As mentioned above, a wide variety of other arrangements, such as venting arrangements, are also within the scope of the present invention.

As best understood with reference to FIG. 17 and reiterating from above, the outer tube 26" is configured, for example, so that open passageway(s) are provided for the hot gasses from the flames 62" to flow into the heating cavity 38" (e.g., gasses from the flames 62 flow into respective lower right and left elongate openings to the heating cavity 38"), and optionally the flames 62 may extend into the heating cavity; and gasses may exhaust from the heating cavity 38" by way of the series of outer vent apertures 310 extend through the outer tube 26". Nonetheless, those of ordinary skill in the art will understand (e.g., with reference to FIG. 17) that, in accordance with the third exemplary embodiment, the outer tube 26" and heating cavity 38" extend substantially all the way around the emitter tube 80.

A discharge aperture 81" may extend through the rear wall 306. Oils and juices that may be produced during the cooking process (e.g., from the food 32a) typically fall to the lower region of the broiling cavity 34" and may flow through the discharge aperture 81". The discharge aperture 81" is typically fitted with a discharge tube 92" that directs the flowing oils and juices to a tray or container 94" where they may be collected.

Throughout the foregoing disclosure, numerous features have been described in specific terms; for example, some features have been described as being cylindrical, and numerous coaxial relationships have been identified. Those skilled in the art will understand that there may be some variability with respect to features described in specific terms. For example, features described as being cylindrical may also and more generally be substantially cylindrical, and the relationships described as being coaxial may also and more generally be substantially coaxial. In addition, although features that have been described as tubes have sometimes been characterized as being cylindrical or substantially cylindrical in the foregoing, those skilled in the art will understand that the tubes are not required to be cylindrical or substantially cylindrical. Indeed, tubes may have a wide variety of cross-sectional shapes, such as, for example, rectangular cross section(s) and/or substantially rectangular cross section(s), and as a specific example, square cross section(s) and/or substantially square cross section(s).

Although the radiant tube broilers have been discussed above as being used primarily for cooking food, the radiant tube broilers may be used in other applications where food is not being cooked, such as in applications where items and/or coatings (e.g., paint, and the like) are to be heated (e.g., dried), in which case the support members (e.g., baskets and cooking grids) may be replaced, if desired, with whatever type of devices might be useful for supporting the items to be heated. That is, the present invention is not limited to applications in which food is to be cooked (i.e., features of the present invention may have a wide range of uses that are not intended to be limited to the examples provided in this disclosure).

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A method of cooking a turkey or other food item having an exterior surface which covers the turkey or other food item, the method comprising the steps of:
    a) placing the turkey or other food item in a broiler cavity of an emitter chamber, the emitter chamber having a longitudinally extending chamber wall which laterally surrounds the broiler cavity and the turkey or other food item placed therein in a lateral surrounding angle of 360°, wherein the longitudinally extending chamber wall has an outer surface and an inner surface, and the outer surface and the inner surface of the longitudinally extending chamber wall each laterally surround the broiler cavity and the turkey or other food item placed therein in a lateral surrounding angle of 360°;
    b) heating the outer surface of the longitudinally extending chamber wall over a surrounding lateral angle of 360° extending around the outer surface so that heat energy is transferred by conduction from the outer surface of the longitudinally extending chamber wall to the inner surface of the longitudinally extending chamber wall, and
    c) emitting from the inner surface at least most of the heat energy transferred by conduction to the inner surface in step (b) as infrared radiant energy into the broiler cavity of the emitter chamber in a surrounding lateral angle of 360° extending around the turkey or other food item so that (i) infrared radiant energy emitted from the inner surface of the longitudinally extending chamber wall is received by the exterior surface of the turkey or other food item by direct emission from the inner surface of the longitudinally extending chamber wall to the exterior surface of the turkey or other food item in a surrounding lateral angle of 360° extending around the turkey or other food item, and (ii) a majority of all cooking energy that is transferred to the turkey or other food within the broiler cavity of the emitter chamber is infrared radiant energy, wherein
    the longitudinally extending chamber wall of the emitter chamber is an upwardly extending emitter tube having a top opening at an upper end thereof through which the turkey or other food item is placed in step (a);
    the inner surface of the longitudinally extending chamber wall of the emitter chamber is an upwardly extending inner surface of the emitter tube which extends around the broiler cavity in a lateral surrounding angle of 360°;
    the outer surface of the longitudinally extending chamber wall of the emitter chamber is an upwardly extending outer surface of the emitter tube which extends around the broiler cavity in a lateral surrounding angle of 360°;
    the emitter chamber has a bottom end; and
    during the heating of the outer surface of the longitudinally extending chamber wall of the emitter chamber in step (b), air flows upwardly into the broiler cavity of the emitter chamber through the bottom end.

2. The method of claim 1 wherein the bottom end of emitter chamber is substantially not heated during the step of heating the outer surface of the longitudinally extending chamber wall of the emitter chamber.

3. A method of cooking a turkey or other food item having an exterior surface which covers the turkey or other food item, the method comprising the steps of:
    a) placing the turkey or other food item in a broiler cavity of an emitter chamber, the emitter chamber having a longitudinally extending chamber wall which laterally surrounds the broiler cavity and the turkey or other food item placed therein in a lateral surrounding angle of 360°, wherein the longitudinally extending chamber wall has an outer surface and an inner surface, and the outer surface and the inner surface of the longitudinally extending chamber wall each laterally surround the broiler cavity and the turkey or other food item placed therein in a lateral surrounding angle of 360°;
    b) heating the outer surface of the longitudinally extending chamber wall over a surrounding lateral angle of 360° extending around the outer surface so that heat energy is transferred by conduction from the outer surface of the longitudinally extending chamber wall to the inner surface of the longitudinally extending chamber wall, and
    c) emitting from the inner surface at least most of the heat energy transferred by conduction to the inner surface in step (b) as infrared radiant energy into the broiler cavity of the emitter chamber in a surrounding lateral angle of 360° extending around the turkey or other food item so that (i) infrared radiant energy emitted from the inner surface of the longitudinally extending chamber wall is received by the exterior surface of the turkey or other food item by direct emission from the inner surface of the longitudinally extending chamber wall to the exterior surface of the turkey or other food item in a surrounding lateral angle of 360° extending around the turkey or other food item, and (ii) a majority of all cooking energy that is transferred to the turkey or other food within the broiler cavity of the emitter chamber is infrared radiant energy, wherein the longitudinally extending chamber wall of the emitter chamber is an upwardly extending emitter tube having a top opening at an upper end thereof through which the turkey or other food item is placed in step (a);

the inner surface of the longitudinally extending chamber wall of the emitter chamber is an upwardly extending inner surface of the emitter tube which extends around the broiler cavity in a lateral surrounding angle of 360°;

the outer surface of the longitudinally extending chamber wall of the emitter chamber is an upwardly extending outer surface of the emitter tube which extends around the broiler cavity in a lateral surrounding angle of 360°; and the turkey or other food item is placed in the broiler cavity of the emitter chamber in step (a) such that:

the turkey or other food item does not substantially contact the upwardly extending inner surface of the emitter tube and is spaced upwardly apart from a bottom end of the broiler cavity and the turkey or other food item is positioned below the top opening of the emitter tube so that, during step (c), a top, a bottom, and all sides of the exterior surface of the turkey or other food item are exposed to and receive a direct emission of infrared radiant energy from the upwardly extending inner surface of the emitter tube.

4. The method of claim 3 wherein the placing of the turkey or other food item into the broiler cavity of the emitter chamber comprises retaining the turkey or other food item in an open wire basket positioned in the broiler cavity of the emitter chamber.

* * * * *

UNITED STATES PATENT AND TRADEMARK OFFICE
CERTIFICATE OF CORRECTION

| | | |
|---|---|---|
| PATENT NO. | : 8,890,037 B2 | Page 1 of 1 |
| APPLICATION NO. | : 13/489710 | |
| DATED | : November 18, 2014 | |
| INVENTOR(S) | : Willie H. Best | |

It is certified that error appears in the above-identified patent and that said Letters Patent is hereby corrected as shown below:

In the Specification

Column 4, Line 38:  The equation should read $Q=0.173\times10^{-8}(A)(T_1^4-T_2^4)$ Signed and Sealed this
Thirty-first Day of March, 2015

Michelle K. Lee
*Director of the United States Patent and Trademark Office*